(12) United States Patent
Lee

(10) Patent No.: US 9,451,167 B2
(45) Date of Patent: Sep. 20, 2016

(54) LENS MOVING UNIT AND CAMERA MODULE HAVING THE SAME

(71) Applicant: LG INNOTEK CO., LTD., Seoul (KR)

(72) Inventor: Kap Jin Lee, Seoul (KR)

(73) Assignee: LG Innotek Co., Ltd., Seoul (KR)

(\*) Notice: Subject to any disclaimer, the term of this patent is extended or adjusted under 35 U.S.C. 154(b) by 0 days.

(21) Appl. No.: 14/605,672

(22) Filed: Jan. 26, 2015

(65) Prior Publication Data

US 2015/0212291 A1    Jul. 30, 2015

(30) Foreign Application Priority Data

Jan. 28, 2014  (KR) .................. 10-2014-0010534
Jun. 11, 2014  (KR) .................. 10-2014-0070523

(51) Int. Cl.
| | | |
|---|---|---|
| H04N 5/225 | (2006.01) | |
| H04N 5/232 | (2006.01) | |
| G03B 13/00 | (2006.01) | |
| G02B 7/08 | (2006.01) | |
| G02B 27/64 | (2006.01) | |
| G02B 13/00 | (2006.01) | |

(52) U.S. Cl.
CPC ............ *H04N 5/23287* (2013.01); *G02B 7/08* (2013.01); *G02B 13/003* (2013.01); *G02B 27/646* (2013.01); *H04N 5/2254* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 2008/0117536 A1 | 5/2008 | Higuchi | |
| 2008/0247063 A1 | 10/2008 | Otsuki et al. | |
| 2010/0309568 A1 | 12/2010 | Takei et al. | |
| 2011/0176046 A1* | 7/2011 | Hu .................. | G02B 7/08 348/335 |
| 2012/0314308 A1 | 12/2012 | Ikushima et al. | |
| 2013/0016427 A1* | 1/2013 | Sugawara .............. | G02B 7/08 359/557 |
| 2013/0039640 A1 | 2/2013 | Sekimoto | |
| 2013/0050515 A1* | 2/2013 | Wu .................. | G02B 7/08 348/208.5 |
| 2013/0170052 A1 | 7/2013 | Yu | |
| 2014/0009675 A1 | 1/2014 | Chiu | |
| 2015/0015729 A1 | 1/2015 | Kasamatsu | |

FOREIGN PATENT DOCUMENTS

| | | |
|---|---|---|
| EP | 2006733 A1 | 12/2008 |
| EP | 2 469 333 A1 | 6/2012 |
| EP | 2808717 A2 | 12/2014 |
| JP | 2012-220785 A | 11/2012 |
| WO | WO 2013/183270 A1 | 12/2013 |

\* cited by examiner

*Primary Examiner* — Mark Monk
(74) *Attorney, Agent, or Firm* — Birch, Stewart, Kolasch & Birch, LLP

(57) ABSTRACT

A lens moving unit for a camera module is disclosed. The lens moving unit includes a first lens moving unit, a second lens moving unit, and a cover member to encompass the first and second lens moving units by being coupled to a base. The first lens moving unit moves in response to the interaction between a magnet and a coil. The lens moving unit is configured to miniaturize a camera module and configured to include a handshake correction function for enhancement of operational reliability to simplify an assembly process.

34 Claims, 16 Drawing Sheets

LENS MOVING UNIT AND CAMERA MODULE HAVING THE SAME

Pursuant to 35 U.S.C. §119 (a), this application claims the benefit of earlier filing date and right of priority to Korean Patent Application Nos. 10-2014-0010534, filed on Jan. 28, 2014, 10-2014-0070523, filed on Jun. 11, 2014 the contents of which are hereby incorporated by reference in their entirety.

BACKGROUND OF THE DISCLOSURE

1. Field

The teachings in accordance with the exemplary embodiments of this present disclosure generally relate to a lens moving unit and a camera module having the same.

2. Background

A miniaturized and low power-consuming camera module is difficult to be applied with a VCM (Voice Coil Motor) technology used for a conventional camera module, and therefore researches have been briskly waged to cope with the difficulty mentioned above.

A camera module mounted on a small electronic device such as a smart phone may be frequently applied with a shock during use and may be minutely shaken by a user handshake during photographing. Thus, development for a technology to additionally install handshake shake correction means has been recently required. The handshake shake correction means are variably researched.

One of the handshake shake correction technologies that corrects the handshake by moving an optical module to x, y axes corresponding to a plane perpendicular to an optical axis suffers from disadvantages such as complex structure and inadequacy to miniaturization, because an optical system must be moved and adjusted within the plane perpendicular to the optical axis for image correction.

SUMMARY

The present disclosure has been made to solve the foregoing disadvantages of the prior art and therefore an object of certain embodiments of the present disclosure is to provide a lens moving unit configured to miniaturize a camera module and configured to include a handshake correction function for enhancement of operational reliability, and a camera module having the same.

Another object of certain embodiments of the present disclosure is to provide a lens moving unit configured to simplify an assembly process and a camera module having the same.

The present disclosure is to solve at least one or more of the above problems and/or disadvantages in whole or in part and to provide at least advantages described hereinafter.

In order to achieve at least the above objects, in whole or in part, and in accordance with the purposes of the present disclosure, as embodied and broadly described, and in one general aspect of the present invention, there is provided a lens moving unit, the lens moving unit comprising:
a first lens moving unit including a bobbin mounted at an inner side with at least one lens and formed at a periphery with a first coil, and a housing configured to support a magnet arranged at a surrounding of the bobbin to move the bobbin and the first coil to a first direction parallel with an optical axis in response to interaction between the magnet and the first coil; and
a second lens moving unit including a base spaced apart at a predetermined distance from the bobbin and the first lens moving unit, a support member configured to movably support the first lens moving unit to second and third directions relative to the base and to supply an electric power to the first coil, and a circuit board including a detection sensor configured to detect positions of the second and third directions of the second lens moving unit relative to a second coil and the base opposite to the magnet of the first lens moving unit to thereby move an entire first lens moving unit including the bobbin to the mutually different second and third directions which is perpendicular to the optical axis in response to the interaction between the magnet and the second coil.

Preferably, but not necessarily, the lens moving unit may further comprise a cover member configured to encompass the first and second lens moving units by being coupled to the base.

Preferably, but not necessarily, the bobbin may include a first stopper protrusively formed at an upper surface with a first height, and a second stopper protrusively formed at a lateral surface of an upper surface to a circumferential direction, wherein the first stopper prevents an inner surface of the cover member from colliding with a bobbin body, and the second stopper prevents the bobbin from colliding with the base.

Preferably, but not necessarily, the housing may include a first surface mounted with four magnets, a second surface configured to interconnect with the first surface and arranged with the support member, a third stopper protrusively formed from an upper surface to prevent interference with the cover member, and a fourth stopper protrusively formed from a floor surface to prevent interference with the base.

Preferably, but not necessarily, the second surface may include an escape groove to prevent the support member from interfering with the housing.

Preferably, but not necessarily, the second surface may further include a staircase unit formed at an upper side of the escape groove.

Preferably, but not necessarily, the second surface may further include a diaphragm configured to accommodate damping silicon.

In another general aspect of the present disclosure, there is provided a lens moving unit, the unit comprising:
a first lens moving unit including a bobbin mounted at an inner side with at least one lens and formed at a periphery with a first coil, and a housing configured to support a magnet arranged at a surrounding of the bobbin to move the bobbin and the first coil to a first direction parallel with an optical axis in response to interaction between the magnet and the first coil;
a second lens moving unit including a base spaced apart at a predetermined distance from the housing, a support member configured to movably support the first lens moving unit to second and third directions relative to the base and to supply an electric power to the first coil, a second coil arranged opposite to the magnet of the first lens moving unit, and a circuit board including a detection sensor configured to detect a position of the first direction of the housing relative to the base by detecting a sensing magnet mounted on the first lens moving unit and changes in magnetic field of the sensing magnet to thereby move the housing to the mutually different second and third directions which is perpendicular to the optical axis in response to the interaction between the magnet and the second coil; and;
a cover member configured to encompass the first and second lens moving units by being coupled to the base.

Preferably, but not necessarily, the lens moving unit may further comprise a second detection sensor configured to detect positions of the second and third directions.

Preferably, but not necessarily, the second coil may include a plurality of circuit boards coupled to an inner lateral wall of the cover member.

Preferably, but not necessarily, the first lens moving unit may include an octagonal bobbin having at least four straight surfaces and corner surfaces configured to connect the at least four straight surfaces, a first coil wound on a periphery of the bobbin, a magnet arranged at a position opposite to the straight surface of the first coil, a housing fixed by the magnet, and upper and bottom elastic members, an inner frame of which is coupled to the bobbin and an outer frame of which is coupled to the housing.

Preferably, but not necessarily, the housing may include a recess groove having a size corresponding to that of the second stopper at a position opposite to that of the second stopper.

Preferably, but not necessarily, the support member may be integrally formed with the upper elastic member.

Preferably, but not necessarily, the support member may include a connection unit connected to the upper elastic member, first and second elastic deformation units extensively formed from the connection unit, and a fixation unit fixedly coupled to the base.

Preferably, but not necessarily, at least four support members may be provided to support the second lens moving unit, and at least two support members further include terminal units each having a different polarity.

Preferably, but not necessarily, the support member may be interposed between the first and second elastic deformation units and may further include a damping connection unit formed in a space formed by the diaphragm.

Preferably, but not necessarily, upper side and bottom side shapes of the first and second elastic deformation units may mutually correspond, while the first and second elastic deformation units are interposed between the damping connection unit.

Preferably, but not necessarily, each of the first and second elastic deformation units may take a shape of a wire free from pattern.

Preferably, but not necessarily, the fixation unit may be wider than each width of the first and second elastic deformation units.

Preferably, but not necessarily, the base may be concavely formed with a support member recess groove at a position opposite to that of the support member.

Preferably, but not necessarily, the support member recess groove may be formed at four corner areas of the base.

Preferably, but not necessarily, the second coil may be formed at an upper surface of the circuit board mounted at an upper side of the base.

Preferably, but not necessarily, the second coil may be provided at an upper surface of the circuit board mounted at an upper surface of the base with a substrate having a pattern coil, and coupled to the circuit board in the form of lamination.

Preferably, but not necessarily, the second coil may be integrally formed at an upper surface of the base in the form of a surface electrode.

Preferably, but not necessarily, the detection sensor may be any one of a Hall sensor aligned with a center of the second coil and insertedly coupled to a detection sensor recess groove formed at the base and a photo reflector.

Preferably, but not necessarily, a total of two detection sensors may be provided, where each imaginary line connecting a center of the base to each center of the detection sensors is perpendicularly arranged.

Preferably, but not necessarily, the magnet may be dual-purposely used as an auto focusing magnet configured to move the bobbin to the first direction and as a handshake correction magnet configured to move the housing to the second and third directions.

Preferably, but not necessarily, the second coil may be formed at an inner surface of the circuit board mounted at an inner lateral surface of the cover member.

Preferably, but not necessarily, the second coil may be provided at an upper surface of the circuit board mounted at an inner lateral surface of the cover member with a substrate having a pattern coil, and may be coupled to the circuit board in the form of lamination.

Preferably, but not necessarily, the second coil may be integrally formed at an inner lateral surface of the cover member in the form of a surface electrode.

Preferably, but not necessarily, the second detection sensor may be any one of a Hall sensor aligned with a center of the second coil and insertedly coupled to a detection sensor recess groove formed at the base and a photo reflector.

Preferably, but not necessarily, the sensing magnet may be arranged at an upper surface of the first lens moving unit.

Preferably, but not necessarily, at least one sensing magnet may be arranged at a corner area of the upper surface of the bobbin.

In still another general aspect of the present disclosure, there is provided a camera module, the camera module comprising:
an image sensor;
a PCB mounted with the image sensor; and
a lens moving unit.

Advantageous Effects

The present disclosure can advantageously provide a lens moving unit capable of miniaturizing a camera module by a reduced height and including a handshake correction function capable of improving an operational reliability.

Furthermore, the lens moving unit according to the present disclosure can advantageously improve assemblage by elastically supporting a housing mounted with a plurality of sheets of lenses through integrated support member formed by bending a part of an upper elastic member free from assembly of separate support member.

Still another advantageous effect is that a damping unit capable of reducing a minute vibration generated from a support member is provided to enable a more stable handshake correction control.

Still further advantageous effect is that modularization is implemented by installing a circuit board mounted at an inner lateral surface of a cover member with a second coil to further simplify an assembly process.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, these exemplary embodiments are provided so that this description will be thorough and complete, and will fully convey the scope of the present inventive concept to those skilled in the art.

Hereinafter, a lens moving unit according to a first exemplary embodiment of the present disclosure will be described in detail with reference to the accompanying drawings.

Figure 1:
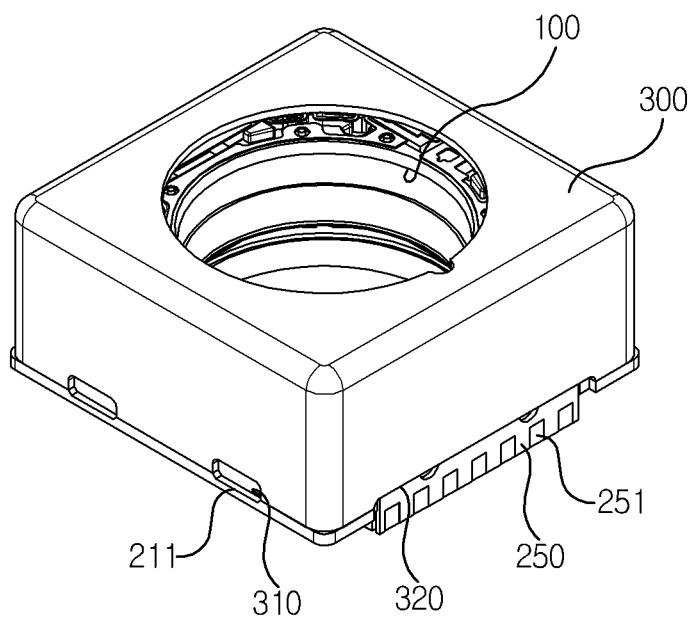
FIG. 1 is a schematic perspective view illustrating a lens moving unit according to an exemplary embodiment of the present invention.
Figure 2:
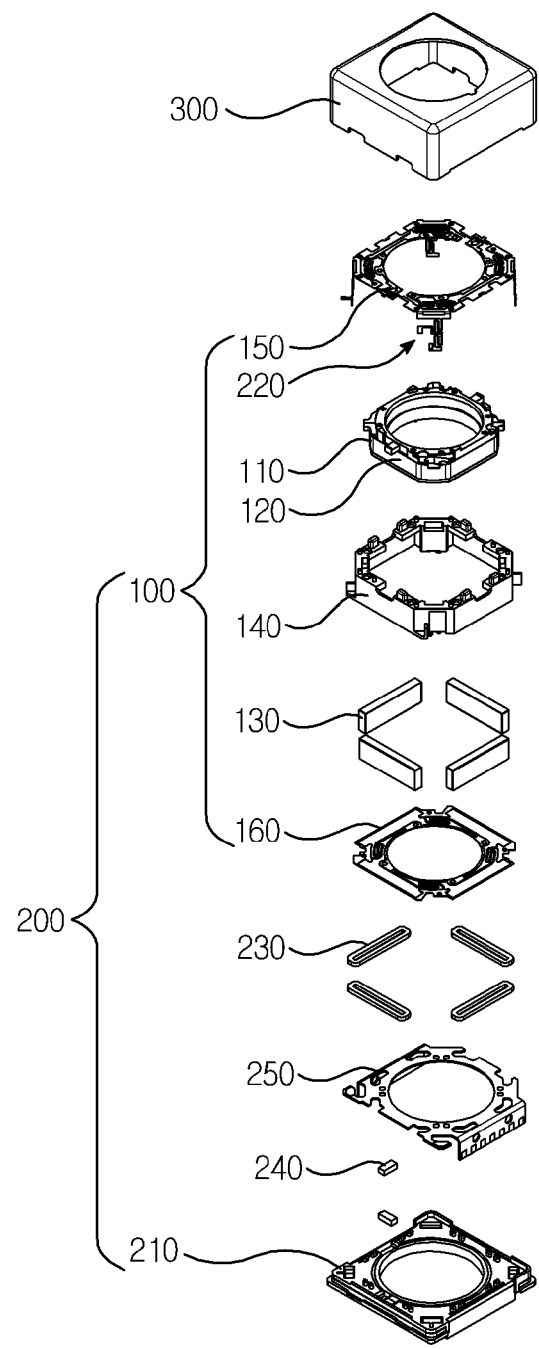
FIG. 2 is an exploded perspective view of FIG. 1.
Figure 3:
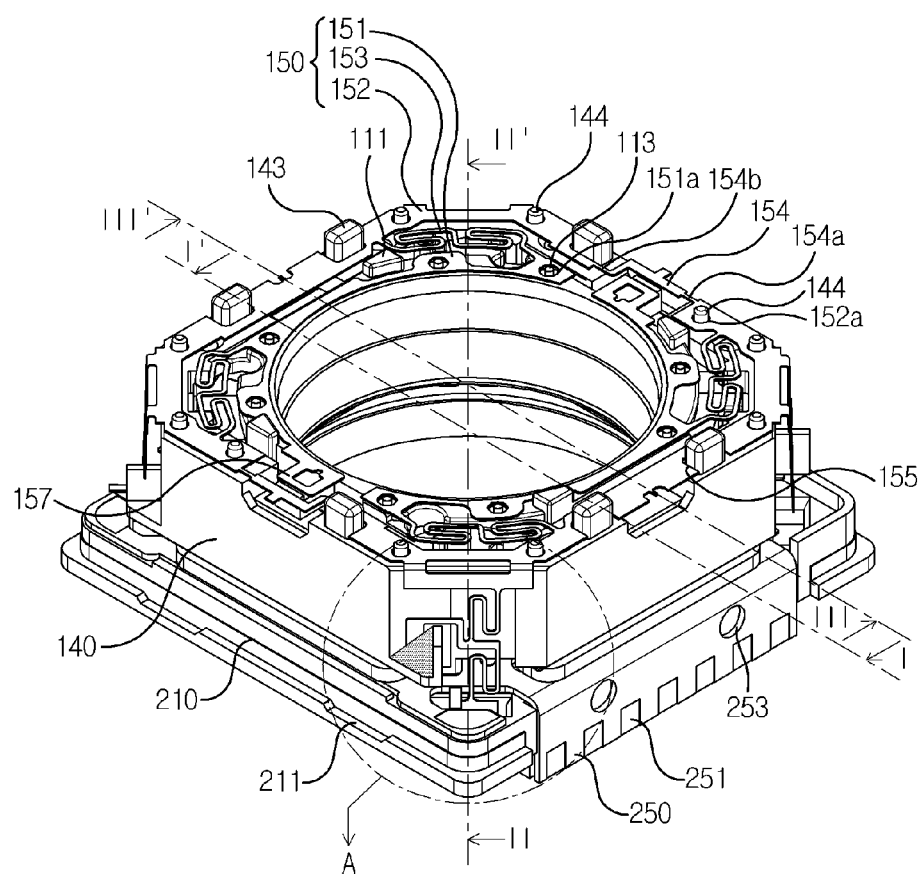
FIG. 3 is a perspective view removed of a cover member of FIG. 1.
Figure 4:
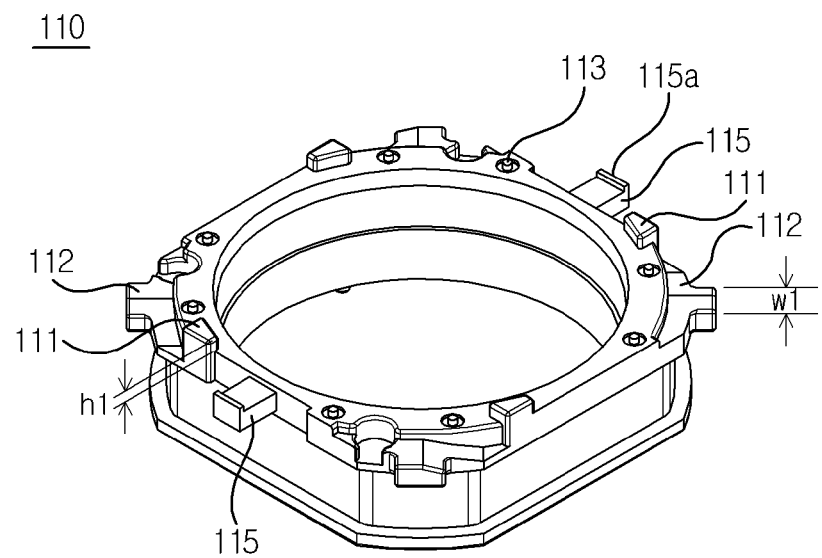
FIG. 4 is a perspective view illustrating a bobbin according to an exemplary embodiment of the present disclosure.
Figure 5:
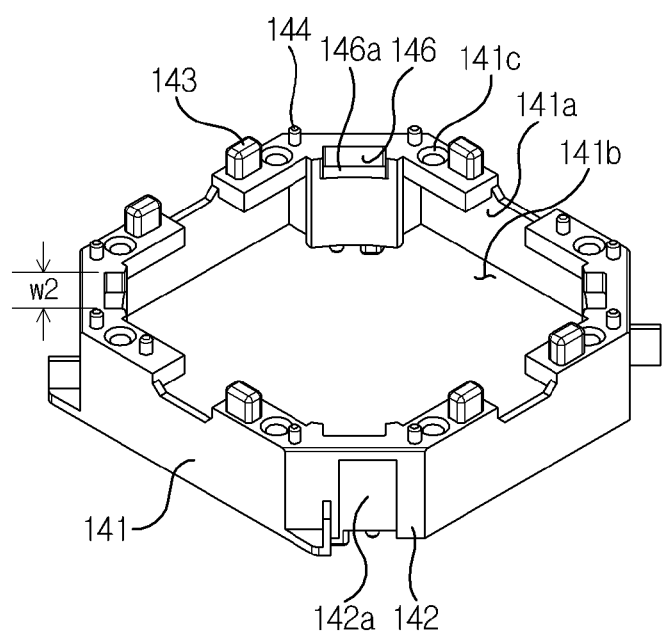
FIGS. 5 and 6 are a perspective view and a rear perspective view illustrating a housing according to an exemplary embodiment of the present disclosure.
Figure 6:
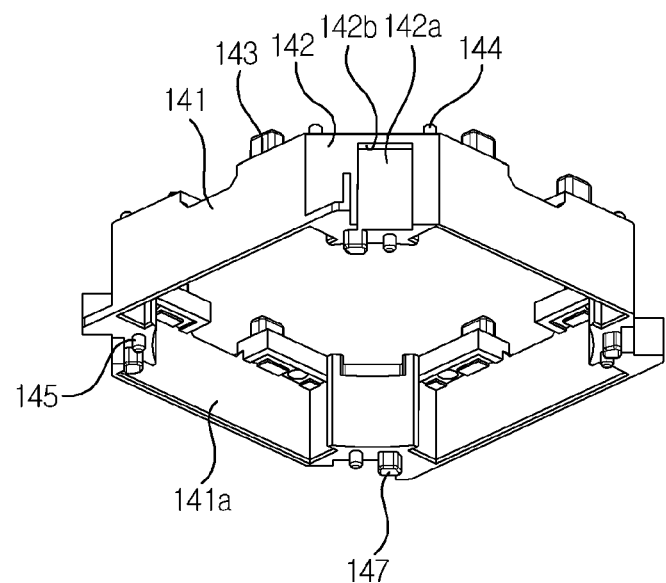
Figure 7:
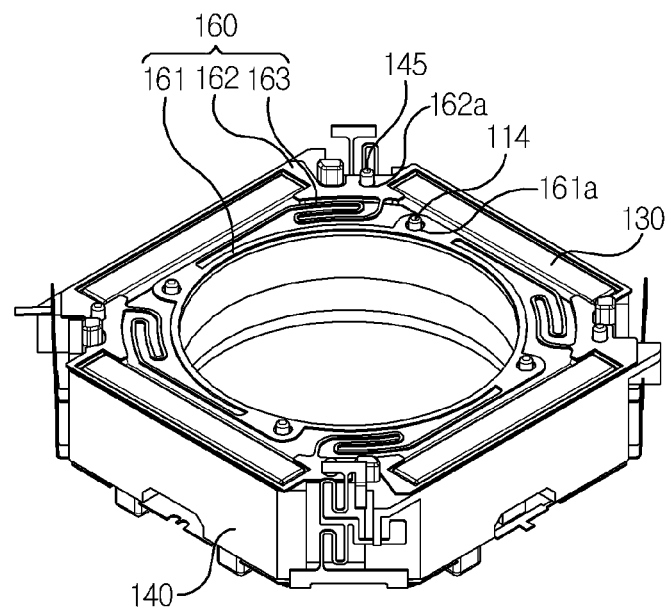
FIG. 7 is a rear perspective view illustrating a housing coupled by a bobbin and a bottom elastic member according to a first exemplary embodiment of the present disclosure.
Figure 8:
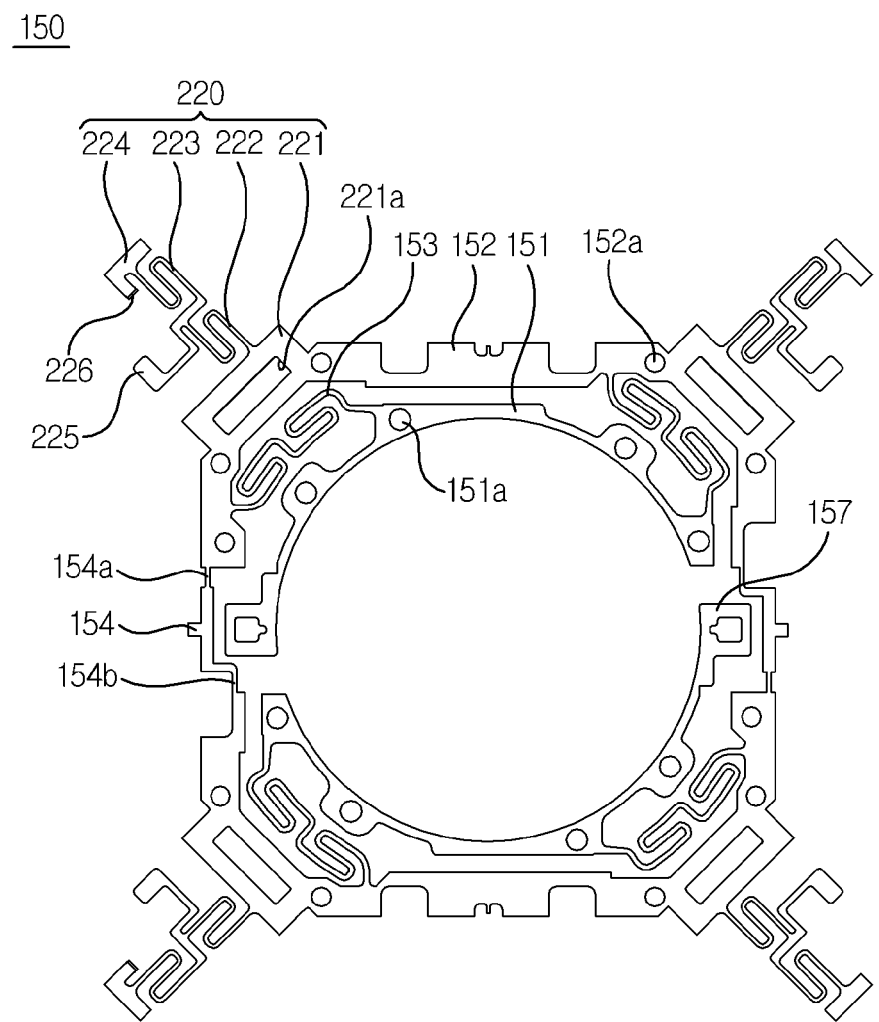
FIG. 8 is a plane view illustrating an initial state of an upper elastic member according to a first exemplary embodiment of the present disclosure.
Figure 9:
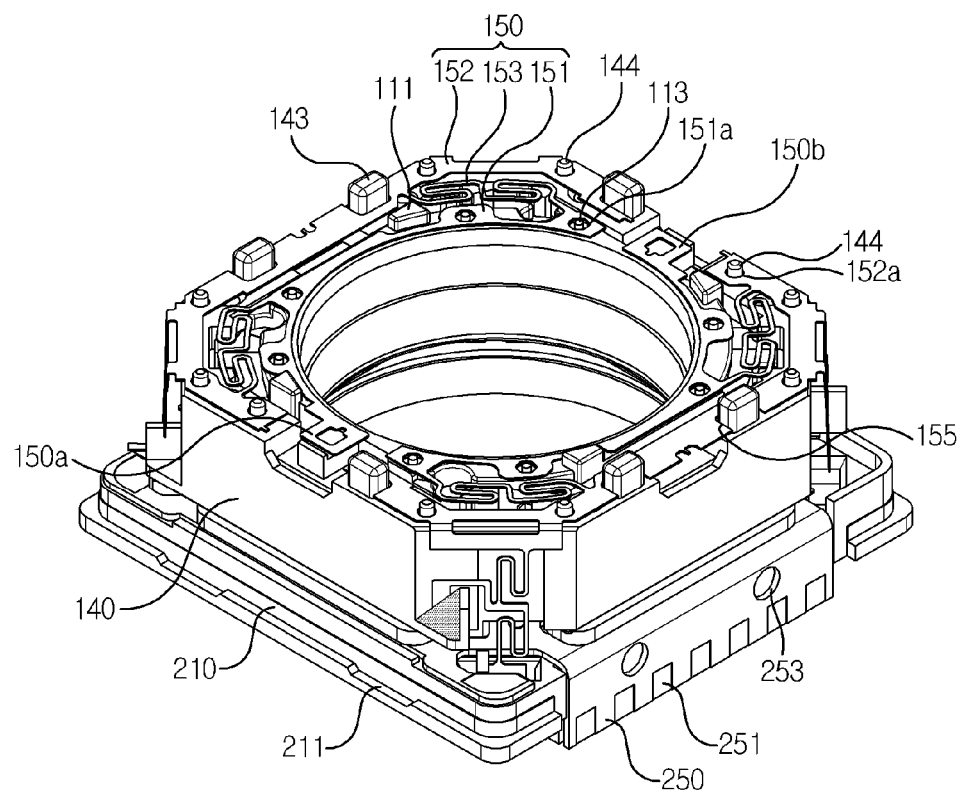
FIG. 9 is a perspective view illustrating a state where the upper elastic member is divided into first and second upper elastic members according to a first exemplary embodiment of the present disclosure.
Figure 10:
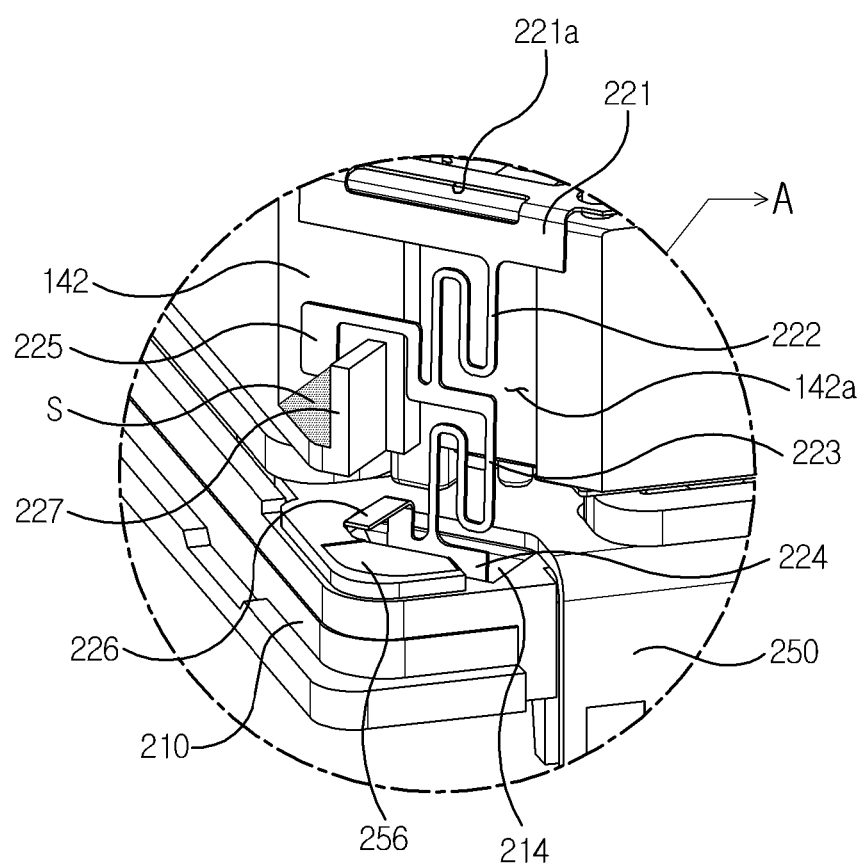
FIG. 10 is an enlarged view of A part of FIG. 3.
Figure 11:
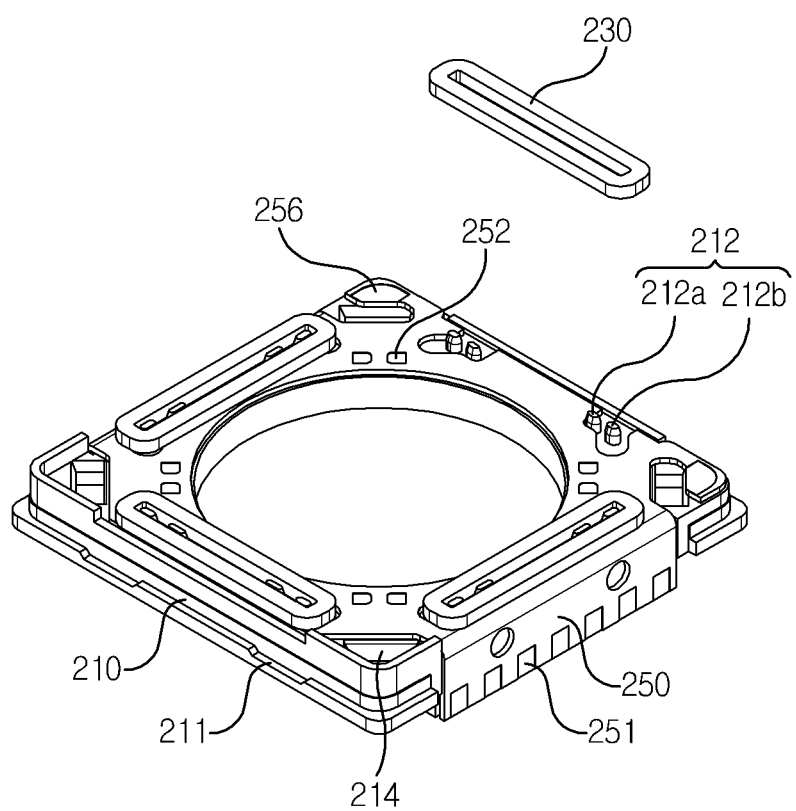
FIGS. 11 and 12 are perspective views illustrating a state where a base, a circuit board and a second coil are separated according to a first exemplary embodiment of the present disclosure.
Figure 12:
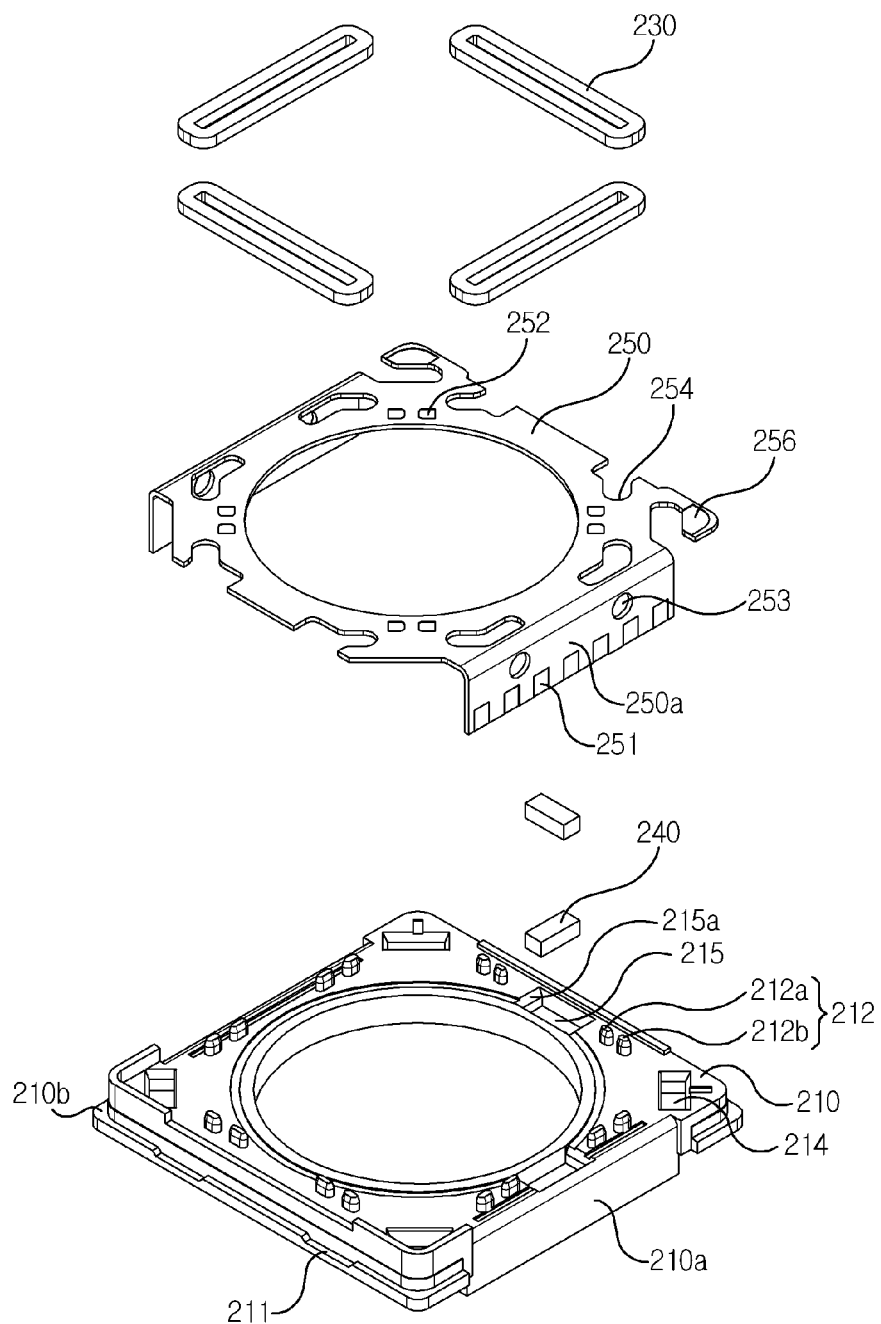
Figure 13:
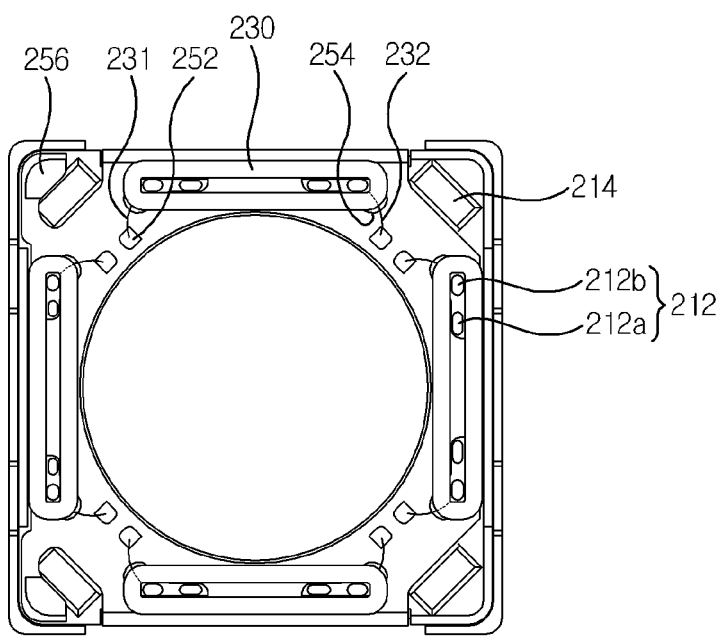
FIG. 13 is a plane view illustrating a coupled relationship of a second coil coupled to a circuit board according to a first exemplary embodiment of the present disclosure.
Figure 14:
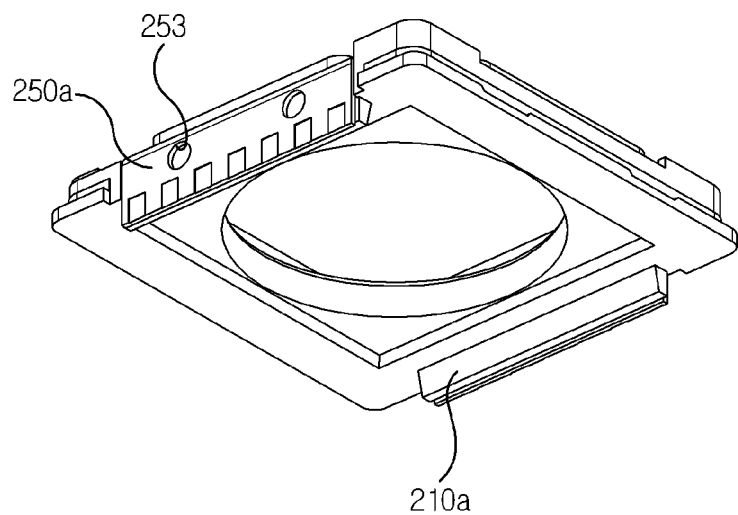
FIG. 14 is a schematic view illustrating a floor surface of a base according to a first exemplary embodiment of the present disclosure.
Figure 15:
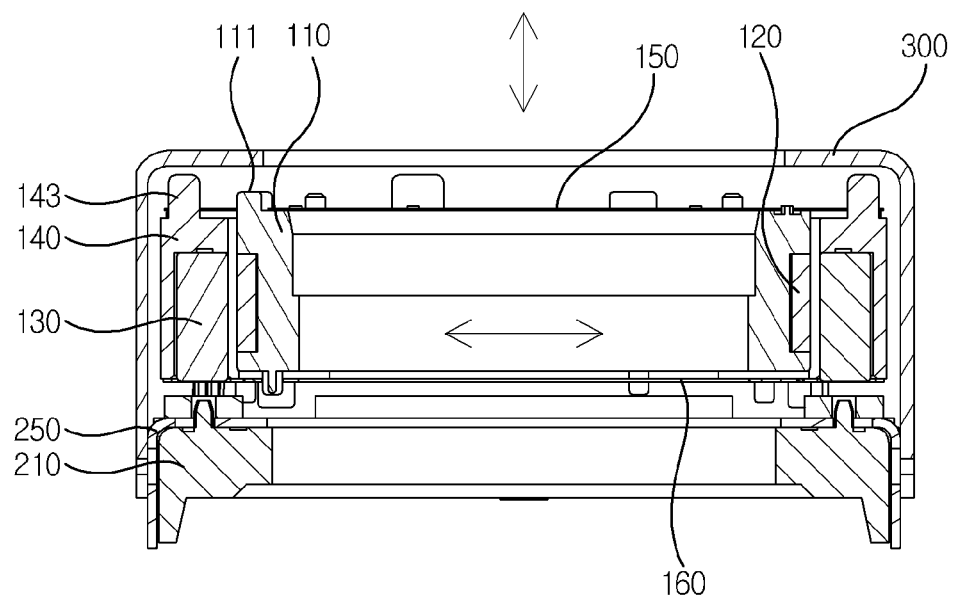
FIG. 15 is a cross-sectional view taken along line I-I' of a lens moving unit of FIG. 3.
Figure 16:
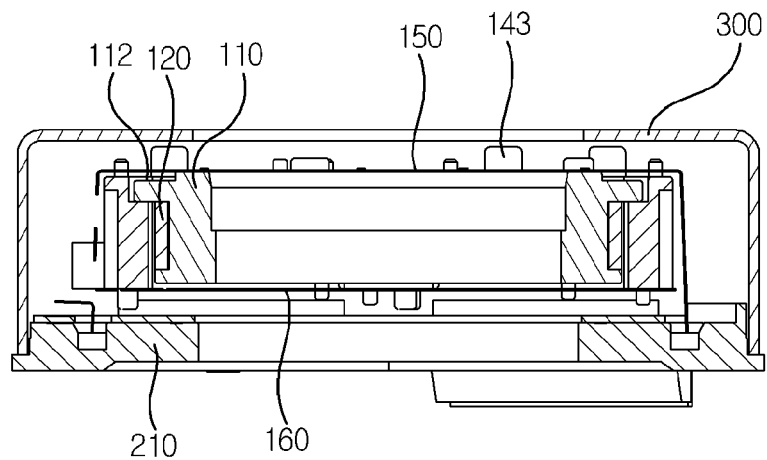
FIG. 16 is a cross-sectional view taken along line II-II' of a lens moving unit of FIG. 3.
Figure 17:
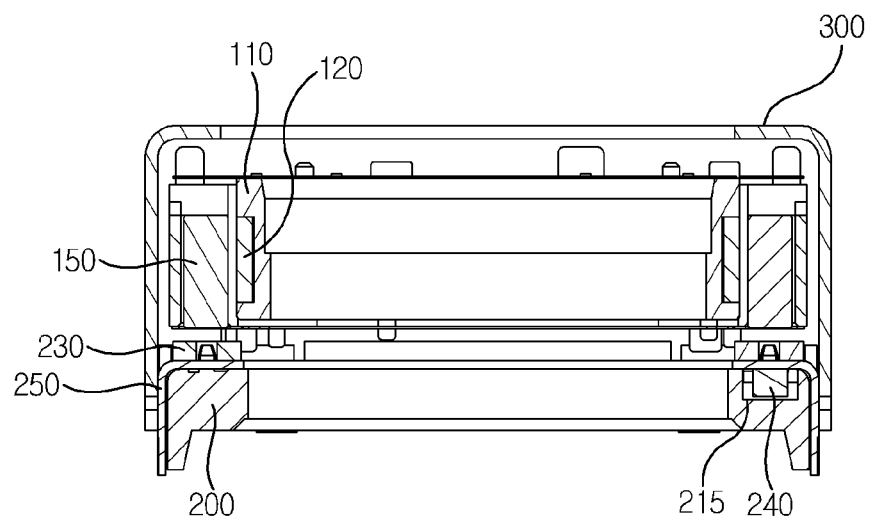
FIG. 17 is a cross-sectional view taken along line of a lens moving unit of FIG. 3.

FIG. 1 is a schematic perspective view illustrating a lens moving unit according to an exemplary embodiment of the present invention, FIG. 2 is an exploded perspective view of FIG. 1, FIG. 3 is a perspective view removed of a cover member of FIG. 1, FIG. 4 is a perspective view illustrating a bobbin according to an exemplary embodiment of the present disclosure, FIGS. 5 and 6 are a perspective view and a rear perspective view illustrating a housing according to an exemplary embodiment of the present disclosure, FIG. 7 is a rear perspective view illustrating a housing coupled by a bobbin and a bottom elastic member according to a first exemplary embodiment of the present disclosure, FIG. 8 is a plane view illustrating an initial state of an upper elastic member according to a first exemplary embodiment of the present disclosure, FIG. 9 is a perspective view illustrating a state where the upper elastic member is divided into first and second upper elastic members according to a first exemplary embodiment of the present disclosure; FIG. 10 is an enlarged view of A part of FIG. 3, FIGS. 11 and 12 are perspective views illustrating a state where a base, a circuit board and a second coil are separated according to a first exemplary embodiment of the present disclosure, FIG. 13 is a plane view illustrating a coupled relationship of a second coil coupled to a circuit board according to a first exemplary embodiment of the present disclosure, FIG. 14 is a schematic view illustrating a floor surface of a base according to a first exemplary embodiment of the present disclosure, FIG. 15 is a cross-sectional view taken along line I-I' of a lens moving unit of FIG. 3, FIG. 16 is a cross-sectional view taken along line II-II' of a lens moving unit of FIG. 3, and FIG. 17 is a cross-sectional view taken along line of a lens moving unit of FIG. 3.

Meantime, a rectangular coordinate system (x, y, and z) may be used for FIGS. 1~17. x axis and y axis in the drawings are defined as planes each perpendicular to an optical axis, where an optical axis direction (z direction) is called as a first direction, x axis direction is called as a second direction and y axis direction is called as a third direction for convenience sake.

A handshake correction device applied to a small-sized camera module in a mobile device such as a smart phone or a tablet PC is a device configured to prevent an outline of a photographed image from being blurred due to vibration generated by handshake of a user during photographing of a stationary image. Furthermore, an auto focusing device is a device configured to automatically capture a focus of an image of an object on an image sensor surface. The handshake correction device and the auto focusing device may be variably configured, and the handshake correction and auto focusing devices according to exemplary embodiments of the present disclosure can perform auto focusing and handshake correction operations by moving an optical module formed with a plural sheet of lenses to a surface perpendicular to an optical axis.

Referring to FIGS. 1 and 2, a lens moving unit according to an exemplary embodiment of the present disclosure may include a first lens moving unit (100) and a second lens moving unit (200). At this time, the first lens moving unit (100) may be a lens moving unit for auto focusing, and the second lens moving unit (200) may be a lens moving unit for handshake correction. Referring to FIGS. 2 and 3, the first lens moving unit (100) may include a bobbin (110), a first coil (120), a magnet (130) and a housing (140).

The bobbin (110) may be reciprocally mounted to a direction parallel to an optical axis in an inner space of the housing (140). The bobbin (110) may be formed at a periphery with a first coil (120, described later) to enable an electronic interaction with the magnet (130). Furthermore, the bobbin (110) may perform an auto focusing function by being electrically supported by upper and bottom elastic members (150, 160) to move to the first direction parallel to the optical axis.

Although not illustrated in the drawings, the bobbin (110) may include therein a lens barrel (not shown) mounted with at least one lens. The lens barrel may be variably coupled to an inner side of the bobbin (110). For example, an inner circumferential surface of the bobbin (110) may be formed with a female screw thread, and a periphery of the lens barrel may be formed with a male screw thread corresponding to the female screw thread, and the lens barrel can be coupled to the bobbin (110) by the screw connection of the female and male screw threads.

The present disclosure is not limited thereto, and instead of forming a screw thread at an inner circumferential surface of the bobbin (110), the lens barrel may be directly fixed to an inside of the bobbin (110) by other methods than the screw connection. Alternatively, one or more sheets may be integrally formed with the bobbin (110) free from the lens barrel. The optical system may be formed with one sheet of lens or two or more sheets of lenses coupled to the lens barrel. Meantime, the bobbin (110) may include a first stopper (111) and/or a second stopper (112).

The first stopper (111) can prevent an upper side surface of the bobbin (110) body from directly colliding with an inner lateral surface of the cover member (300, illustrated in FIGS. 1 and 15), even if the bobbin (110) moves over a regulated scope due to outside shock when the bobbin (110) moves to the first direction parallel to the optical axis for performing the auto focusing function. Furthermore, the first stopper (111) may also function to guide an installation position of the upper elastic member (150).

Referring to FIG. 4, a plurality of first stoppers (111) according to the exemplary embodiment of the present disclosure may be protrusively formed upwards each at a first height (h1), where at least four first stoppers (111) may be protrusively formed in a shape of a polygonal pillar. The first stopper (111) may be symmetrically provided relative to a center of the bobbin (110), and may be also provided in a non-symmetrical structure where interference with the other parts is ruled out as illustrated in FIG. 4.

The second stopper (112) can prevent a floor surface of the bobbin (110) body from directly colliding with a base (210, illustrated in FIGS. 2 and 16) and an upper surface of a circuit board (250) even if the bobbin (110) moves over a regulated scope due to outside shock when the bobbin (110) moves to the first direction parallel to the optical axis for performing the auto focusing function. Furthermore, the second stopper (112) may be protrusively formed at a corner area of the bobbin (110) to a circumferential direction, and the housing (140) may be formed at a position opposite to that of the second stopper (112) with a recess groove (146).

When a mutually-contacted state of the second stopper (112) and a floor surface (146a, see FIG. 5) of the recess groove (146) is configured as an initial position, the auto focusing function may be performed in such a manner that the bobbin (110) lifts up when a current is supplied to the first coil (120) as in the single direction control of the conventional VCM, and the bobbin (120) lifts down when the current is turned off.

When a configuration is provided as an initial position where the second stopper (112) and the floor surface (146a, see FIG. 5) of the recess groove (146) are mutually spaced apart at a predetermined distance, the auto focusing function may be performed in such a manner that control is made in response to a current direction as a bi-directional control in the conventional VCM, and the bobbin (120) moves to an upward direction or a downward direction perpendicular to the optical axis. For example, a forward current is supplied, the bobbin (110) may move upwards, and when a backward current is supplied, the bobbin (110) may move downwards.

Meantime, the recess groove (146) of the housing (140) corresponding to the second stopper (112) is concavely formed with a second width (w2) {corresponding to a first width (w1)} having a predetermined allowance from the first width (w1) of the second stopper (112), the second stopper (112) may be restricted from rotating inside the recess groove (146). Then, the second stopper (112) can prevent the bobbin (110) from rotating even if the bobbin (112) rotates to a direction about an optical axis, instead of an optical direction.

Furthermore, an upper surface and a bottom surface of the bobbin (110) may be protrusively formed with a plurality of upper support protrusions (113) and a plurality of bottom support protrusions (114, see FIG. 7). Referring to FIG. 3, the upper support protrusion (113) may be provided in a cylindrical shape or an angular pillar shape, and may couple and fix an inner lateral frame (151) of the upper elastic member (150) to the bobbin (110). A first through hole (151a) may be formed at a position opposite to that of the upper support protrusion (113) of the inner lateral frame (151) according to an exemplary embodiment of the present disclosure.

At this time, the upper support protrusion (113) and the first through hole (151a) may be fixed by thermal bonding or may be fixed by an adhesive member such as an epoxy. Furthermore, as illustrated in FIGS. 3 and 4, a plural number of upper support protrusions (113) may be formed. At this time, a distance between the upper support protrusions (113) may be adequately arranged within a scope avoidable of interference of adjacent parts. That is, each upper support protrusion (113) may be symmetrically spaced apart from the other at a predetermined distance about the bobbin (110), or may be symmetrically formed about a particular imaginary line passing a center of the bobbin (110).

Now, referring to FIG. 7, the bottom support protrusion (114) may be provided in a cylindrical shape or an angular pillar shape like the upper support protrusion (113), and may couple and fix an inner lateral frame (161) of the bottom elastic member (160) to the bobbin (110). A second through hole (161a) may be formed at a position opposite to that of the bottom support protrusion (114) of the inner lateral frame (161) according to an exemplary embodiment of the present disclosure.

At this time the bottom support protrusion (114) and the second through hole (161a) may be fixed by thermal bonding or may be fixed by an adhesive such as an epoxy. Furthermore, as illustrated in FIG. 7, a plural number of bottom support protrusions (114) may be formed. At this time, a distance between the bottom support protrusions (114) may be adequately arranged within a scope avoidable of interference of adjacent parts. That is, each bottom support protrusion (114) may be symmetrically spaced apart from the other at a predetermined distance about the bobbin (110).

Meantime, as illustrated in FIG. 7, the number of bottom support protrusions (114) may be smaller than that of the upper support protrusions (113), which is due to the different shapes between the upper elastic member (150) and the bottom elastic member (160).

That is, as illustrated in FIG. 4, each of the upper elastic members (150) must be formed in a mutually bisected electrically non-connected structure to allow each member to function as a terminal for applying a current to the first coil (120) and a sufficient number of upper support protrusions (113) is fixedly provided to prevent the Upper elastic members (150) from incompletely coupled with the bobbin (110).

Meanwhile, as illustrated in FIG. 6, the bottom elastic member (160) is formed in one body to allow stable coupling even with only a fewer number of bottom support protrusions (114) than that of the upper elastic member (150). Furthermore, in contrary to the exemplary embodiment, each of the bottom elastic members (160) may be formed in a mutually bisected electrically non-connected structure to allow each member to function as a terminal for applying a current to the first coil (120), where the upper elastic members (150) may be formed in one body.

Furthermore, two winding protrusions (115) may be provided at an upper peripheral surface of the bobbin (110). The winding protrusion (115) may be respectively wound by both distal ends of the first coil (120), where a conductible connection with a pair of solder units (157) provided at the upper elastic member (150) can be realized. The winding protrusion (115) may be arranged in a pair at a horizontally symmetrical position about the bobbin (110).

Furthermore, the soldering coupling of the first coil (120) wound on the winding protrusion (115) at the solder unit (157) also functions to tightly couple the inner lateral frame (151) of the upper elastic member (150) to an upper side surface of the bobbin (110) without any floating. A distal end of the winding protrusion (115) may be formed with a staircase (115a) to prevent both end lines of the wound first coil (120) from being separated. The first coil (120) may be provided in a ring-shaped coil block insertedly coupled to a periphery of the bobbin (110). However, the present disclosure is not limited thereto, and the first coil (120) may be directly wound on the periphery of the bobbin (110).

In the exemplary embodiment of the present disclosure, the first coil (120) may be formed in an approximately octagonal shape, the shape of which corresponds to that of the periphery of the bobbin (110), where the bobbin (120) may be also provided in an octagonal shape. Furthermore, the first coil (120) may be provided with at least four surfaces with a straight line, and a corner area connecting the four surfaces may be round or straight. At this time, a part formed with a straight line may be a surface opposite to the magnet (130).

Furthermore, a surface of the magnet (130) opposite to the first coil (120) may have a same curvature as that of the first coil (120). That is, when the first coil (120) is a straight line, a surface of the magnet (130) opposite to the first coil (120) may be a straight line, and when the first coil (120) is a curved line, a surface of the magnet (130) opposite to the first coil (120) may be a curved line. Furthermore even if the first coil (120) is a curved line, a surface of magnet (130) opposite to the first coil (120) may be a straight line, and vice versa.

The first coil (120) performs an auto focusing function by moving the bobbin (110) to a direction parallel with the optical axis, and when a current is supplied to the magnet (130), an electromagnetic force can be formed through interaction with the magnet (130) and the formed electromagnetic force can move the bobbin (110).

Meantime, the first coil (120) may be formed opposite to the magnet (130), and when the magnet (130) is formed in one body to allow an entire surface opposite to the first coil (130) to have a same polarity, the first coil (130) may also have the same polarity at a surface opposite to the magnet (130). Meantime, although not described, when the magnet (130) is bisected at a surface perpendicular to the optical axis to allow a surface opposite to the first coil (130) to be divided to two or more sections, the first coil (130) may also be divided in the number corresponding to that of divided magnet (130).

The magnet (130) may be mounted at a position opposite to that of the first coil (130). In the exemplary embodiment of the present disclosure, the magnet (130) may be installed at a position corresponding to that of the first coil (120) of the housing (140) as illustrated in FIG. 2. The magnet (130) may be configured in one body, and the magnet (130) according to the exemplary embodiment of the present disclosure may be arranged with an N pole at a surface opposite to the first coil (120) with an S pole at an outside surface. The present disclosure is not limited thereto, and the reverse is also possible. Furthermore, as explained above, the magnet (130) may be bisected on a plain surface perpendicular to the optical axis.

At least two magnets (130) may be installed and four magnets (130) may be installed according to the exemplary embodiment of the present disclosure. At this time, the magnet (130) may be formed in a shape of a rectangular parallelepiped each surface having a predetermined width, and a broad surface may be installed on each lateral surface of the housing (140). At this time, the mutually opposite magnets (130) may be installed on a parallel base.

Furthermore, the magnet (130) may be arranged to face the first coil (120). At this time, each surface on which the magnet (130) and the first coil (120) face each other may be arranged in a plain surface to be mutually parallel. The present disclosure is not limited thereto, and any one surface of the magnet (130) and the first coil (120) may have a plain surface, and another surface may be formed in a curved surface. Alternatively, all surfaces surface on which the magnet (130) and the first coil (120) face each other may be arranged in a curved surface. At this time, curvatures of surfaces on which the magnet (130) and the first coil (120) face each other may be same.

When the magnet (130) is arranged in the shape of a rectangular parallelepiped as illustrated, one pair of a plurality of magnets (130) may be parallel arranged to the second direction, and the other pair of magnets may be arranged to the third direction, whereby the moving control of the housing (140) for handshake correction (described later) can be made possible.

The housing (140) may be formed in an approximately square shape, and may be formed an approximately in an octagonal shape as illustrated in FIG. 5 according to the exemplary embodiment of the present disclosure. At this time, the housing (140) may include a first surface (141) and a second surface (142). The first surface (141) may be a surface mounted with the magnet (130) and the second surface may be a surface mounted with a support member (220, described later).

The first surface (141) may be formed flat, and may be formed equal to or greater than that of the magnet (130). At this time, the magnet (130) may be fixed to a magnet recess unit (141a) formed at an inner surface of the first surface (141). The magnet recess unit (141a) may be formed with a concave groove corresponding in size to the magnet (130), and may be arranged at least at four surfaces opposite to the magnet (130). At this time, a floor surface of the magnet recess unit (141a), that is, a surface opposite to the second coil (230, described later), is formed with an opening (141b) to allow a floor surface of the magnet (130) to directly face the second coil (230). Meantime, the magnet (130) may be secured to the magnet recess unit (141a) using an adhesive.

However, the present disclosure is not limited thereto, and may be fixed using an adhesive member such as a double-sided tape.

Alternatively, it may be possible to form the magnet recess unit (141a) of a window-shaped recess hole from which a part of the magnet can be exposed or in which a part of the magnet can be inserted, instead of forming the magnet recess unit (141a) in a concave groove as illustrated in FIG. 5. Meantime, an upper surface of the first surface (141) may be formed with an adhesive agent inlet hole (141c) configured to infuse epoxy for fixation. According the exemplary embodiment of the present disclosure, the adhesive agent inlet hole (141c) may be provided in a tapering cylindrical shape to infuse an adhesive agent through an exposed upper surface of the housing (140).

The housing (140) may be protrusively formed at an upper surface with a plurality of third stoppers (143). The third stopper (143) serves to prevent the cover member (300, described later) from colliding with the housing (140) body, where the upper surface of the housing (140) is prevented from directly colliding with an inner lateral surface of the cover member (300) when there is generated an external shock. Furthermore, the third stopper (143) also functions to guide an installation position of the upper elastic member (150). To this end, the upper elastic member (150) may be formed with a guide groove (155) having a shape corresponding to that of the third stopper (143) at a position opposite to that of the third stopper (143).

Meanwhile, the first surface (141) may be arranged in parallel with a lateral surface of the cover member (300, described later). Furthermore, the first surface (141) may be formed to have a greater surface than that of the second surface (142).

Furthermore, referring to FIGS. 5 and 6, the second surface (142) may be concavely formed with an escape groove (142a) having a predetermined depth. At this time, the escape groove (142a) may be formed at a floor surface with an opening to prevent a fixation part of bottom lateral unit at the support member (220, described later) from interfering with the housing (140). Furthermore, as illustrated in FIG. 6, the escape groove (142a) may be formed at an upper side with a staircase (142b) to support an inner side of an upper lateral part of the support member (220).

Now, referring to FIGS. 3, 5 and 6, the housing (140) may be protrusively formed at an upper side with a plurality of upper frame support protrusions (144) coupled by an external frame (152) of the upper elastic member (150), At this time, the number of upper frame support protrusions (144) may be greater than that of upper support protrusion (113), which is because a length of the external frame (152) is longer than that of the inner frame (151). Meantime, the external frame (152) opposite to the upper frame support protrusion (144) may be formed with a third through hole (152a) having a shape corresponding thereto, where the external frame (152) is fixed by adhesive agent or heat fusion.

Furthermore, the housing (140) may be formed at a bottom side with a plurality of bottom frame support protrusions (145) coupled by an external frame (162) of the bottom elastic member (160). At this time, the number of bottom frame support protrusion (145) may be greater than that of bottom support protrusion (114), which is because a length of the external frame (162) of bottom elastic member (160) is longer than that of the inner frame (161). Meantime, the external frame (162) opposite to the bottom frame support protrusion (145) may be formed with a fourth through hole (162a) having a shape corresponding thereto, where the external frame (162) is fixed by adhesive agent or heat fusion.

Furthermore, the housing (140) may be protrusively formed at a bottom surface with a fourth stopper (147). The fourth stopper (147) serves to prevent a floor surface of the housing (140) from colliding with the base (210, described later) and/or the circuit board (150). The fourth stopper (147) may also maintain a predetermined distance from the base (210) and/or the circuit board (150) during an initial operation and normal operation, whereby the housing (140) can be distanced downwardly from the base (210) and upwardly distanced from the cover member (300) to maintain an optical axis directional height using a support member (220, described later) free from vertical interference. Thus, the housing (140) can perform a shifting operation second and third directions which are front, rear, left and right directions on a plane parallel with the optical axis. This operation will be re-described later in more details.

Meantime, lift-up and/or lift-down operations to a direction parallel with the optical axis of the bobbin (110) may be elastically supported by the upper and bottom elastic members (150, 160). At this time, the upper and bottom elastic members (150, 160) may be provided in leaf springs.

Referring to FIGS. 3 and 7, the upper and bottom elastic members (150, 160) may include inner frames (151, 161) coupled to the bobbin (110), external frames (152, 162) coupled to the housing (140) and connection units (153, 163) connecting the inner and external frames (151, 161, 152, 162). The connection units (153, 163) may be bent at least once to form a predetermined shape of pattern. The lift-up and/or lift-down operation of the bobbin (110) to the first direction parallel with the optical axis can be elastically supported by position change and fine deformation of the connection units (153, 163).

In the present exemplary embodiment, the upper elastic member (150) may be divided to a bisected first upper elastic member (150a) and second upper elastic member (150b), as illustrated in FIG. 9. The first upper elastic member (150a) and second upper elastic member (150b) of the upper elastic member (150) can be applied with mutually different polarities by the bisected structure. That is, as illustrated in FIGS. 3 and 8, a solder unit (157) is provided at a position opposite to that of a pair of winding protrusions (115) wound by both distal ends of the first coil (120) after the inner frames (151) and the external frames (152) are respectively coupled to the bobbin (110) and the housing (140), where the first upper elastic member (150a) and second upper elastic member (150b) can be applied with mutually different polarities by the solder unit (157) configured to perform a conductive connection using solder and the like.

At this time, the external frame (152) of the upper elastic member (150) is provided with at least two cut-off pieces (154) to form a one bodily manufactured, assembly-completed upper elastic member (150) to bisected structure. At this time, both distal ends (154a, 154b) of the cut-off piece (154) may be formed with a narrower width than that of the external frame (152) to enable easy cut-off. The both distal ends (154a, 154b) of the cut-off piece (154) thus formed enable an assembly operator to clearly and visually ascertain a cut-out position of the external frame (152), whereby cut-out can be conveniently performed using a cutting tool. Furthermore, unlike the exemplary embodiment, the cut-out pieces (154) are not formed and mutually separated first and second upper elastic members are separately formed to allow being coupled to the bobbin (110) and the housing (140).

Meanwhile, according to the exemplary embodiment of the present disclosure, a corner area of the upper elastic member (150) may be integrally formed with the support member (220) to allow the support member (220) to be bent to a direction parallel with an optical axis before or after the assembly step as shown in FIG. 8. However, the present disclosure is not limited thereto, and the support member (220) may be formed as a separate member from the upper elastic member (150). When the support member (220) is formed as a separate member, the support member (220) may be formed with a leaf spring, a coil spring, a suspension wire and any member capable of elastically supporting the upper elastic member (150).

Meantime, the upper and bottom elastic member (150, 160), the bobbin (110) and the housing (140) may be assembled by a bonding operation using heat fusion and/or adhesive agent. At this time, the fixing operation may be finished by bonding using an adhesive agent after fixation using heat fusion according to assembly order.

For example, when the bobbin (110) and the inner frame (161) of the bottom elastic member (150) are initially assembled, and then the housing (140) and the external frame (162) of the bottom elastic member (160) are secondly assembled, the bottom support protrusion (114) of the bobbin (110), the second through hole (164a) coupled thereto and the fourth through hole (162a) coupled to the bottom frame support protrusion (145) of the housing (140) may be fixed by heat fusion. Thirdly, when the bobbin (110) and the inner frame (151) of the upper elastic member (150) are initially assembled, the upper support protrusion (113) of the bobbin (110) and the first through hole (151a) coupled thereto may be fixed by heat fusion. Lastly and fourthly, when the housing (140) and the external frame (152) of the upper elastic member (150) are fixed, the third through hole (152a) coupled to the upper frame support protrusion (144) of the housing (140) may be bonded by coating using an adhesive agent such as epoxy and the like.

However, these assembly orders may be changed. That is, the first to third fixing assembly processes of may be performed by heat fusion and the last and fourth step of fixing process may be performed by bonding. This is because there may be involve with deformation such as twist at the time of heat fusion, and the last step can complement the deformation by bonding.

Particularly, as mentioned above, in view of the fact that the upper elastic member (150) is provided with a bisected structure, the number of upper support protrusions (113) may be formed greater than that of the bottom support protrusions (114) to prevent a floating phenomenon that may be generated at the time of separation of the upper elastic member (150).

The second lens moving unit (200), which is a handshake correction lens moving unit, may include a first lens moving (100), a base (210), a support member (220), a second coil (230) and a position detection sensor (240), and may further include a circuit board (250).

The first lens moving unit (100) may be configured as mentioned above, and may be replaced with an optical system configured to realize an auto focusing function using other methods than the above configuration. That is, instead of using the auto focusing actuator of VCM method, the first lens moving unit (100) may be configured with an optical system using a single lens moving actuator or an actuator of reflective index-changeable method. That is, the first lens moving unit (100) may be used by any optical actuator capable of performing an auto focusing function. However, there may be a requirement that a magnet (130) be installed at a position opposite to that of the second coil (230).

Referring to FIGS. 11 to 14, the base (210) may take an approximate square shape, and include the support member (220) at four corner areas. The base (210) may be provided with a plurality of first groove parts (211) configured to inject an adhesive agent therein when fixing the cover member (300) using an adhesive agent. At least one first groove part (211) may be formed at a surface not opposite to that of a terminal surface (250a) of the circuit board (250, described later). A surface opposite to that of the terminal surface (250a) of the base may be formed with a terminal surface support groove (210a) having a size corresponding to that of the terminal surface (250a). The terminal surface support groove (210a) may be concavely and inwardly formed from a periphery of the base (210) at a predetermined depth to prevent the terminal surface (250a) from protruding to outside or to adjust a protruding amount.

Furthermore, the base (210) is formed at a circumferential surface with a staircase (210b) to guide the cover member (300) coupled to an upper side of the staircase (210b), and may be coupled to allow a distal end of the cover member to be surface-contacted. At this time, distal ends of the staircase (210b) and the cover member (300) may be bonded, fixed and sealed using an adhesive agent.

The base (210) may be protrusively formed at an upper surface with a plurality of guide protrusions (212), where the guide protrusion may be provided as a first guide protrusion (212a) and/or a second guide protrusion (212b). The first guide protrusion (212a) and the second guide protrusion (212b) may be changed in positions if necessary. The inwardly arranged first guide protrusion (212a) may guide a design position of the circuit board (250), and the second guide protrusion (212b) may guide an inner circumferential surface of the second coil (230).

In the present exemplary embodiment, a total of four second coils (230) may be provided, and a total of eight guide protrusions (212) may be provided including the first and second guide protrusions (212a, 212b). That is, the first and second guide protrusions (212a, 212b) may, in a pair, guide the circuit board (250) and the second coil (230). Furthermore, each of the first and second guide protrusions (212a, 212b) may guide the circuit board (250) and/or the second coil (230) according to design.

Furthermore, the base (210) may be concavely formed at an upper surface with a support member recess groove (214) configured to insert the support member (220) thereinto. The support member recess groove (214) may be coated with an adhesive agent to fix the support member (220) lest the support member (220) be moved. The support member recess groove (214) may be inserted and fixed by a distal end of the support member (220).

Furthermore, the base (210) may be provided at an upper surface with a detection sensor recess groove (215) arrangeable with the detection sensor (240). In the present exemplary embodiment, a total of two detection sensor recess grooves (215) may be provided, where the detection sensor (240) is arranged at the detection sensor recess groove (215) to detect the degree of movement of the first lens moving unit (100) to the second and third directions. To this end, two detection sensor recess grooves (215) may be arranged to allow an angle formed by an imaginary line connecting a center of the detection sensor recess groove (215) and a center of the base to be at 90°.

At least one surface of the detection sensor recess grooves (215) may be formed with a tapered-off inclined surface (215a) to facilitate a smooth injection of epoxy for assembling the detection sensor (240). Furthermore, the detection sensor recess grooves (215) may not be injected a separate epoxy, but the epoxy may be injected to fix the detection sensor (215). A position of the detection sensor recess grooves (215) may be at a center of the second coil (230) or may be near a center of the second coil (230). Alternatively, a center of the second coil (230) may match a center of the detection sensor (240).

Meanwhile, as illustrated in FIG. 14, a recess unit (260) mounted with a filter (not shown) may be formed at a border area at a bottom surface of the base (210). The filter may be an UV filter. However, the present disclosure is not limited thereto, and a filter may be arranged at the recess unit (260) of the base (210) using a separate sensor holder (not shown) as a medium. Furthermore, the recess unit (260) of the base (210) may be coupled by a sensor substrate (not shown) mounted with an image sensor (not shown) to constitute a camera module.

Referring to FIGS. 3 and 10, the support member (220) may be coupled to the base (210) by being bent at the assembly step while being integrally formed at four corner areas of the upper elastic member (150). A distal end of the support member (220) may be inserted into the support member recess groove (214) to be fixed by epoxy and the like.

According to the present exemplary embodiment, four support members (220) may be formed as the support members (220) are formed at four corner areas of the upper elastic member (150). However, the present disclosure is not limited thereto, and a total of eight support members (220) may be formed when two support members (220) are formed at each corner area of the upper elastic member (150). The support member (220) according to the exemplary embodiment may include a connection unit (221), elastic deformation units (222, 223), a fixation unit (224) and a damping connection unit (225), and at least two support members (220) out of the four support members (220) may include a terminal unit (226).

The connection unit (221), which is a unit configured to connect with a corner surface of the upper elastic member (150), may be centrally formed with a through hole (221a) to allow performing a bending work at left and right sides of the through hole (221a), whereby the support member (220) can be easily bent with a smaller force to form the connection unit (221). The shape of the connection unit (221) is not limited thereto, and any shape may be allowable as long as the connection unit is bendable even without a through hole. Furthermore, when the support member (220) is formed as a member separate from the upper elastic member (150), the connection unit (221) may be a part where the support member (220) and the upper elastic member (150) are electrically connected.

The elastic deformation units (222, 223) may be provided by being bent at least once to form a predetermined shape of a pattern. According to the present exemplary embodiment, the elastic deformation unit may be formed as first and second elastic deformation units (222, 223) via the damping connection unit (225), and also may be formed as mutually corresponding shapes. For example, as illustrated in FIG. 10, when the first elastic deformation unit (222) is provided in an N shape formed with a straight unit to a direction parallel with an optical axis through four times of bending, the second elastic deformation unit (223) may be also formed in a corresponding shape as that of the first elastic deformation unit. The N shape is a simple example, and other patterns including a zigzag shape may be also possible. At this time, the first and second elastic deformation units (222, 223) may be formed in one unit instead of two separate units, and may be also formed as a pattern-less suspension wire.

The first and second elastic deformation units (222, 223) may be minutely deformed to a direction the housing (140) moves when the housing (140) moves to the second and third directions perpendicular to the optical axis. Then, the housing (140) can move only to the second and third directions which are plain surfaces perpendicular to the optical axis with almost no position change relative to the first direction which is a direction parallel with the optical axis, whereby accuracy of handshake correction can be enhanced.

The fixation unit (224) may be provided at a distal end of the support member (220). Furthermore, the fixation unit (224) may be provided in a plate shape wider than that of the elastic deformation units (222, 223). The present disclosure is not limited thereto and the fixation unit (224) may have a width equal to or narrower than that of the elastic deformation units (222, 223). The fixation unit (224) may be inserted into the support member recess groove (214) of the base (210) and may be fixed and coupled by adhesion member such as epoxy. However, the present disclosure is not limited thereto, and the fixation unit (224) may be press-fitted into the support member recess groove (214) by forming the fixation unit (224) to match to the support member recess groove (214) formation-wise.

The damping connection unit (225) may be arranged in the middle of the elastic deformation units (222, 223) and a distal end of the damping connection unit (225) may be arranged at a space part (S) formed via a diaphragm (227) formed at the housing (140). Furthermore, the damping connection unit (225) may be arranged at any position of the support member (220) between the connection unit (221) and the fixation unit (224).

The space part (S) may be formed by three surfaces formed by a floor surface of the base (210), the diaphragm (227) and a lateral wall of the housing (140), and the damping connection unit (225) arranged in the space part (S) may be coated with silicone for damping. At this time, the silicone is coated after inclining the housing (140) to allow the three surfaces to be positioned downwards at the silicone coating step, whereby the silicone is prevented from flowing down. Furthermore, the silicone may be so made as to maintain a gel state in order to allow the damping connection unit (225) to be in an incompletely fixed state. Thus, the damping connection unit (225) may move little by little in response to the movement of the elastic deformation units (222, 223) to allow absorbing a minute vibration transmitted from the elastic deformation units (222, 223).

In the present exemplary embodiment, the damping connection unit (225) may be formed in a hook shape, where a distal end thereof can climb over the diaphragm 227). The present disclosure is not limited thereto, and the damping connection unit (225) may be formed in a straight line to be arranged at a space part side.

As noted above, the upper elastic member (150) may be divided to a bisected first upper elastic member (150a) and second upper elastic member (150b). Thus, a terminal unit (226) may be provided to supply an electric power to the first upper elastic member (150a) and second upper elastic member (150b). The terminal unit (226) may be formed only at two members of the four support members (220), because the terminal (226) only needs a positive (+) electric power or a negative electric (−).

Referring to FIG. 10, the terminal unit (226) may be formed by bending at least once a plate-shaped member extended from the fixation unit (224). The terminal unit (226) may be conductively connected to a pad (256) provided at the PCB (250) using a soldering method and the like. To this end, a surface of the terminal unit (226) and a surface of the pad (256) may be arranged to face each other. At this time, the terminal unit (226) and the pad (256) may surface-contact each other, and as illustrated in FIG. 10, a conductive member like a solder may be interposed between the terminal unit (226) and the pad (256). The support member (220) can supply an electric power of mutually different polarities to the upper elastic member (150) through the coupling between the terminal unit (226) and the pad (256), whereby a fixation power towards the base (210) of the support member (220) can be simultaneously increased.

The second coil (230) may be arranged to face the magnet (130) fixed at the housing (140). For example, the second coil (230) may be arranged at an external side of the magnet (130). Alternatively, the second coil (230) may be spaced apart from downward side of the magnet (130) at a predetermined distance. In the present exemplary embodiment, a total of four second coils (230) may be installed at four surfaces. However, the present disclosure is not limited thereto, and only one for second direction and one for third direction may be installed, and four or more second coils may be installed.

Furthermore, the second coil (230) may be formed by winding a doughnut-shaped wire, and as illustrated in FIG. 13, a start line (231) and an end line (232) of the second coil (230) may be conductively connected to a terminal (252) formed on the circuit board (250). The second coil (230) may be installed at an upper surface of the circuit board (250) arranged at an upper side of the base (210). However, the present disclosure is not limited thereto, and the second coil (230) may be tightly connected to the base (210), may be spaced apart from the base (210) at a predetermined distance, or may be formed on a separate substrate, where the substrate may be stacked on the circuit board (250).

In the present exemplary embodiment, the second coil (230) may be guided in installation position thereof by first and second guide protrusions (212a, 212b) protrusively formed on an upper surface of the base (210).

The detection sensor (240) may be arranged at a center of the second coil (230) to detect the movement of the housing (140). The detection sensor (240) may be provided as a Hall sensor, and any sensor may be used for the detection sensor (240) as long as it can detect a change in magnetic force. The detection sensor (240) may be mounted at a bottom surface of the circuit board (250), where the mounted detection sensor (240) may be inserted into a detection sensor recess groove (215) formed at the base (210). The bottom surface of the circuit board (250) may be an opposite surface of a surface arranged with the second coil (230).

The circuit board (250) may be coupled to an upper surface of the base (210), and may be guide in installation position by the first guide protrusion (212a) as described above. The circuit board (250) may be formed with at least one bent terminal surface (250a). In the present exemplary embodiment, the circuit board is formed with two bent terminal surfaces (250a). The terminal surface (250a) may be arranged with a plurality of terminals (251) to supply a current to the first and second coils (120, 230) by receiving an external electric power. The number of terminals formed on the terminal surface (250a) may be increased or decreased depending on types of elements necessary for control. Meantime, according to the present exemplary embodiment, the PCB may be replaced with an FPCB (Flexible PCB). The present disclosure however is not limited thereto, and the terminal of the circuit board (250) may be directly formed on a surface of the base (210) by using a surface electrode method.

Furthermore, the circuit board (250) may be formed with an escape groove (254) to pass therethrough one of the start line (231) and the end line (232) of the second coil (230). The escape groove (254) may be formed with a space for passing a line extracted from an inner lateral surface of the second coil (230) out of the start line (231) and the end line (232) of the second coil (230). The inner lateral surface of the second coil (230) may be a surface contacted by the second coil (230) and the circuit board (250). That is, as illustrated in FIG. 13, one of the start line (231) and the end line (232) of the second coil (230) may be extracted from the floor surface of the second coil (230). However, when the start line (231) is extracted from a periphery of the second coil (230), the end line (232) may be extracted from an inner surface of the second coil (230).

At this time, in view of the fact that the end line (232) is also extracted from the floor surface of the second coil (230), when the end line (232) is extracted from the inner surface of the second coil (230) to the outside, the end line (232) must pass through the floor surface of the second coil (230). Thus, when the end line (232) is extracted from the floor surface of the second coil (230), the second coil (230) may not be horizontally installed because of thickness of the end line. Thus, the escape groove (254) may be formed on the circuit board (250) in a predetermined shape to allow an entire floor surface of the second coil (230) to always surface-contact an entire surface of an installation surface, whereby a space unit is made to be formed at a floor surface side near a distal end of the second coil (230) as high as a height of the escape groove (254). Then, the end line (232) may pass the space unit to be extracted to outside of the second coil (230).

The circuit board (250) may be installed near a corner with a pad (256) conductively connected to the terminal unit (226) provided at the support member (220). The pad (256) made of a conductive material is formed at an upper surface of an angled portion of the corner of the circuit board (250) may be connected to an electric circuit (not shown) inside the circuit board (250), or may be connected to two leader lines of the first coil (120). Meanwhile, two corners of the four corners of the circuit board (250) may be formed with the pad (256), and the remaining two corners may be free from the pad (256). The corner portions of no pads (256) may still maintain the angle shape, but may form chamfered corners as illustrated in FIG. 12.

Meanwhile, the detection sensor (240) may be arranged at a center side of the second coil (230) with the circuit board (250) being situated therebetween. That is, the detection sensor (240) may not be directly connected to the second coil (230), but the second coil (230) may be formed at an upper surface of the circuit board (250) and the detection sensor may be formed at a bottom surface of the circuit board (250). According to the present exemplary embodiment, the detection sensor (240), the second coil (230) and the magnet (130) may be preferably arranged on a same axis, whereby the second coil (230) may move the housing (140) to the second and third directions to perform the handshake correction function.

The cover member (300) may be formed in an approximate box shape, and may encompass the first and second lens moving units (100, 200). At this time, as illustrated in FIG. 1, the cover member (300) may be formed at a position opposite to that of the first groove part (211) of the base (210) with a second groove unit (310), and a groove unit of a predetermined area may be formed by coupling of the first and second groove parts (211, 310). The groove unit may be coated with an adhesive member having a viscosity. That is, the adhesive member coated on the groove unit can fill up a gap formed by opposite surfaces of the cover member (300) and the base (210) using the groove unit, whereby the cover member (300) and the base (210) may be coupled to be sealed together.

Furthermore, a surface opposite to the terminal surface (250a) of the circuit board (250) at the cover member (300) may be formed with a third groove unit (320) to prevent interference with the plurality of terminals (251) formed at the terminal surface (250a). The third groove unit (320) may be concavely formed on an entire surface opposite to the terminal surface (250a), and the adhesive member may be inwardly coated to seal the cover member (300), the base (140) and the circuit board (250).

Meanwhile, the first, second and third groove parts (211, 310, 320) may be respectively formed at the base (140) and the cover member (300). However, the present disclosure is not limited thereto, and a similar shape to that of the first, second and third groove parts (211, 310, 320) may be formed only on the base (140) or only on the cover member (300).

Meanwhile, as illustrated in FIG. 14, the base (140) may be formed at a bottom surface with a concave groove part (270) on which a filter (not shown) may be installed. Furthermore, an image sensor (not shown) may be arranged between the PCB (not shown) and the groove part (270). A camera module may be formed by assembling a lens barrel (not shown) to the bobbin (110). Alternatively, the base (210) may further include a separately-formed image sensor holder (not shown) at a bottom surface thereof. Furthermore, the base may be downwardly extended to directly couple an image sensor-mounted camera module substrate (not shown) to a floor surface side. Furthermore, the camera module may be applied to a mobile device such as a mobile phone.

Thus, according to the abovementioned configuration, the magnet (130) may be shared to realize the auto focusing operation and the handshake correction operation of the first and second lens moving units (100, 200) to reduce the number of parts and to enhance the responsiveness by reducing the weight of the housing (140). Of course, an auto focusing magnet and a handshake correction magnet may be separately formed. Furthermore, the support member (220) may be integrally formed with the upper elastic member (150), and bent to reduce the weight and to enhance the assemblage. Furthermore, an outside minute vibration transmitted to the support member (220) may be absorbed by using silicone, whereby a more accurate handshake correction control can be accomplished.

Next, a second exemplary embodiment of the present disclosure will be described in detail with reference to the accompanying drawings.

Figure 18:
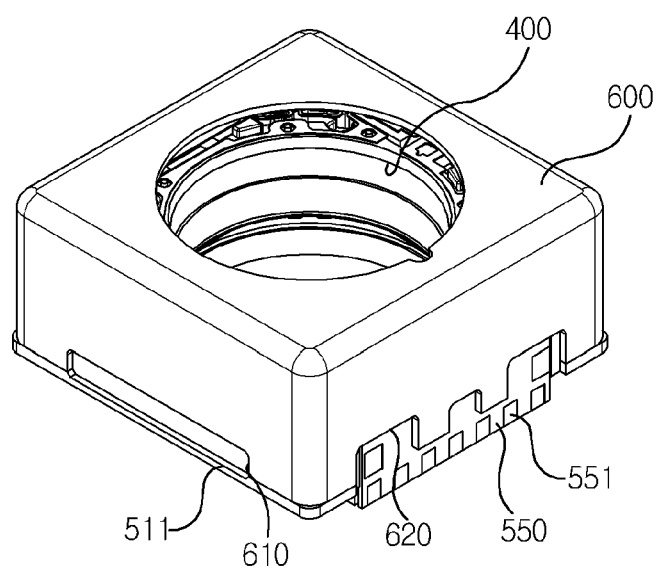
FIG. 18 is a schematic perspective view illustrating a lens moving unit according to a second exemplary embodiment of the present disclosure.
Figure 19:
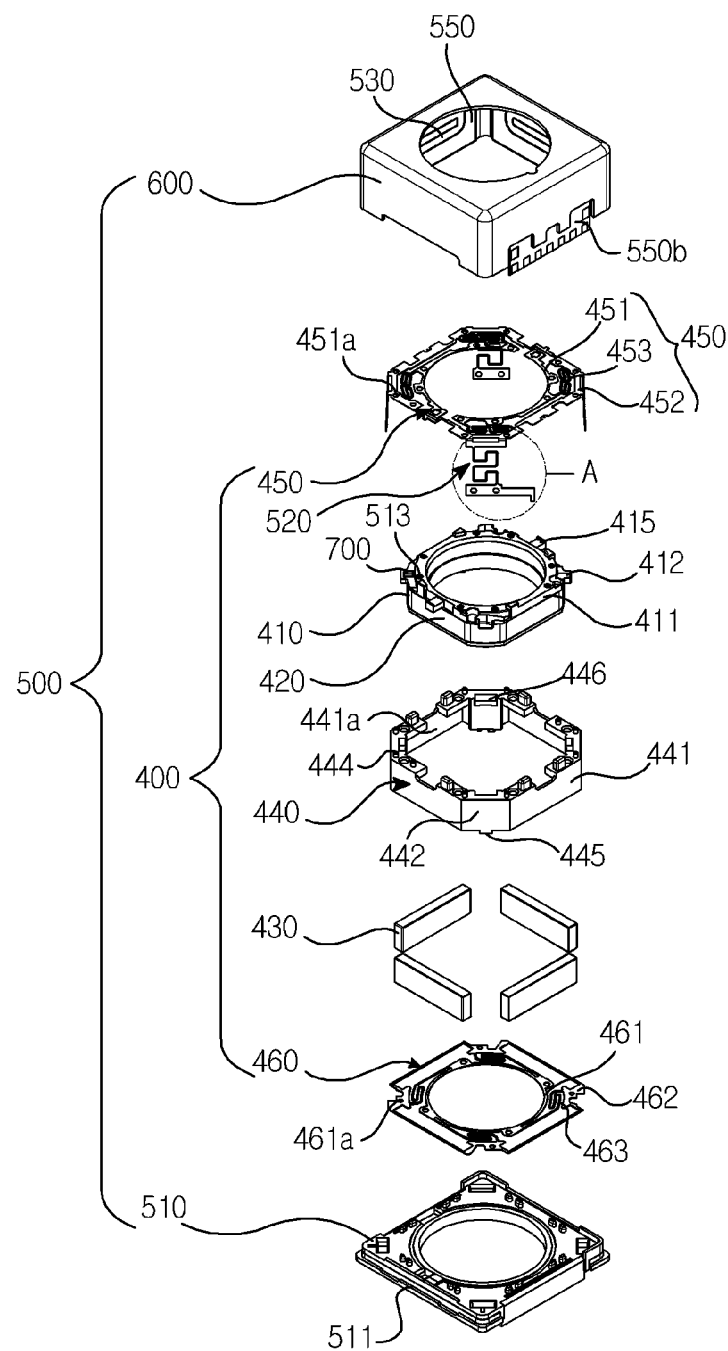
FIG. 19 is an exploded perspective view of FIG. 18.
Figure 20:
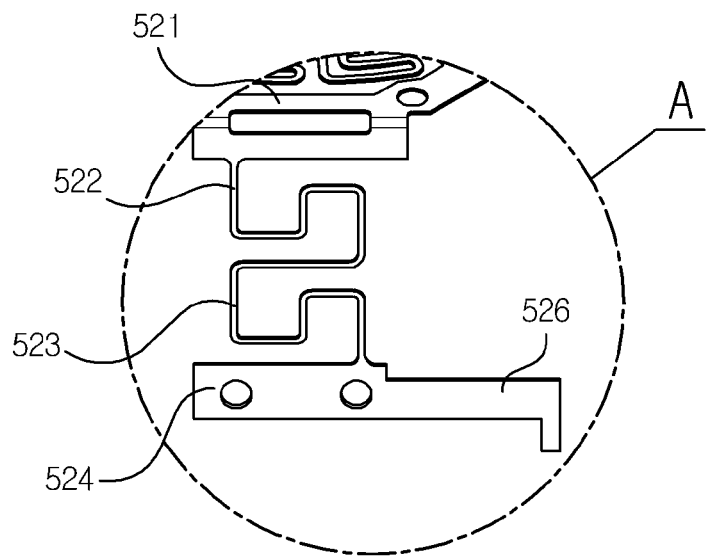
FIG. 20 is an enlarged view of a support member of FIG. 19.
Figure 21:
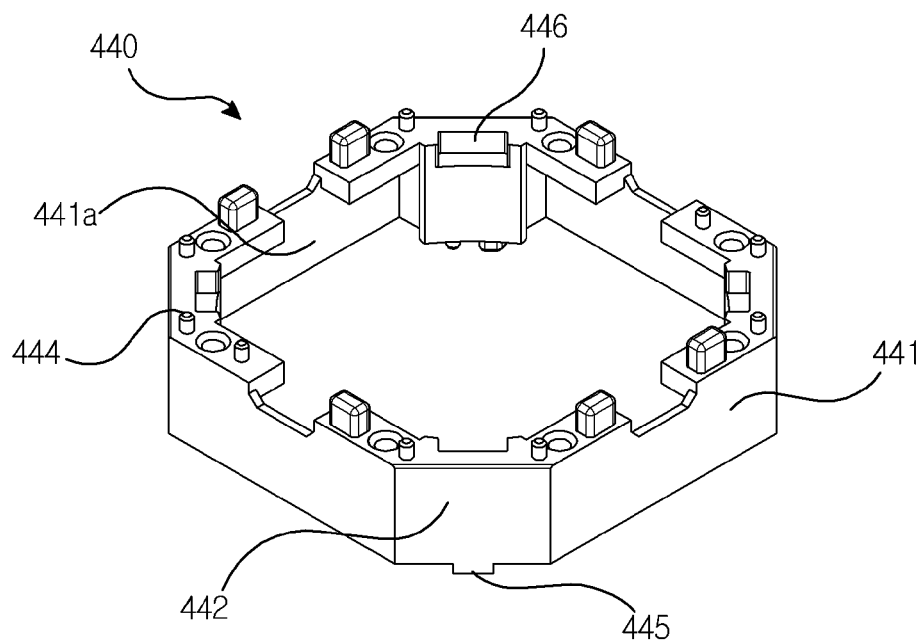
FIG. 21 is a schematic perspective view illustrating a housing according to a second exemplary embodiment of the present disclosure.
Figure 22:
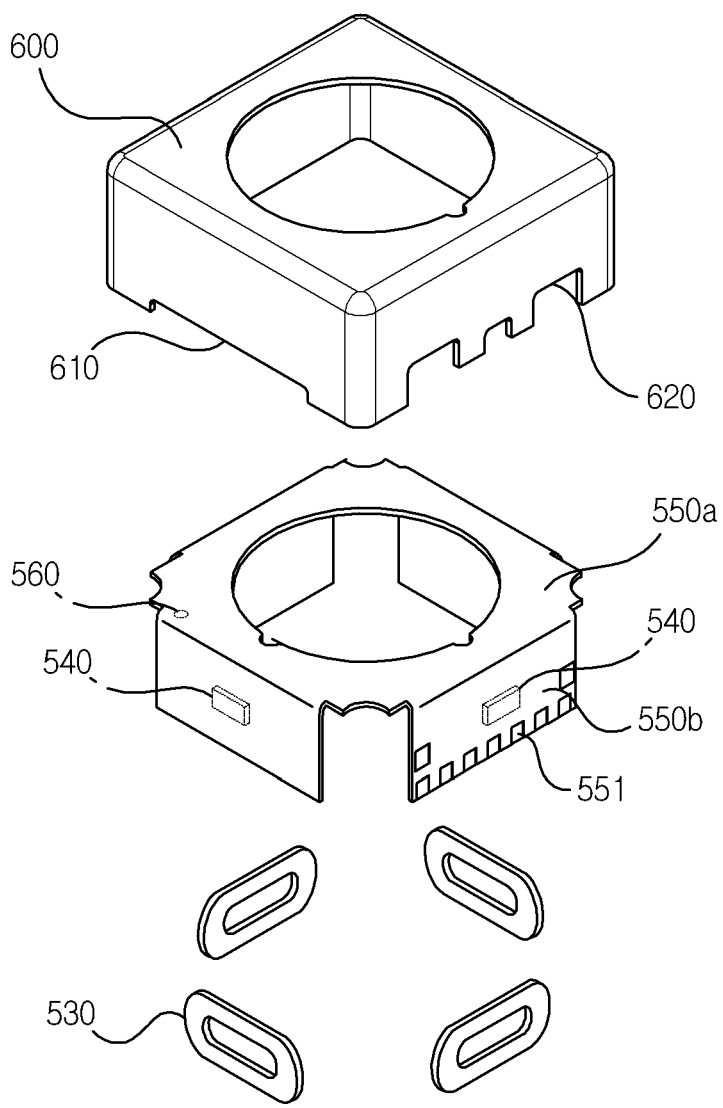
FIG. 22 is an exploded perspective view illustrating a cover member assembly according to a second exemplary embodiment of the present disclosure.

FIG. 18 is a schematic perspective view illustrating a lens moving unit according to a second exemplary embodiment of the present disclosure, FIG. 19 is an exploded perspective view of FIG. 18, FIG. 20 is an enlarged view of a support member of FIG. 19, FIG. 21 is a schematic perspective view illustrating a housing according to a second exemplary embodiment of the present disclosure, and FIG. 22 is an exploded perspective view illustrating a cover member assembly according to a second exemplary embodiment of the present disclosure.

Referring to FIGS. 18 and 19, the lens moving unit according to the second exemplary embodiment of the present disclosure may include a first lens moving unit (400) and a second lens moving unit (500). At this time, the first lens moving unit (400) may be a lens moving unit for auto focusing, and the second lens moving unit (500) may be a lens moving unit for handshake correction. Referring to FIGS. 19 and 20, the first lens moving unit (400) may include a bobbin (410), a first coil (420), a magnet (430) and a housing (440).

The bobbin (410) may be reciprocally mounted to a direction parallel to an optical axis in an inner space of the housing (440). The bobbin (410) may be formed at a periphery with a first coil (420, described later) to enable an electronic interaction with the magnet (430). Furthermore, the bobbin (410) may perform an auto focusing function by being electrically supported by upper and bottom elastic members (450, 460) to move to the first direction parallel to the optical axis.

Although not illustrated in the drawings, the bobbin (410) may include therein a lens barrel (not shown) mounted with at least one lens. The lens barrel may be variably coupled to an inner side of the bobbin (410). For example, an inner circumferential surface of the bobbin (410) may be formed with a female screw thread, and a periphery of the lens barrel may be formed with a male screw thread corresponding to the female screw thread, and the lens barrel can be coupled to the bobbin (410) by the screw connection of the female and male screw threads.

The present disclosure is not limited thereto, and instead of forming a screw thread at an inner circumferential surface of the bobbin (410), the lens barrel may be directly fixed to an inside of the bobbin (410) by other methods than the screw connection. Alternatively, one or more sheets of lenses may be integrally formed with the bobbin (410) free from the lens barrel. The optical system may be formed with one sheet of lens or two or more sheets of lenses coupled to the lens barrel.

Furthermore, an upper surface and a bottom surface of the bobbin (410) may be protrusively formed with a plurality of upper support protrusions (413) and a plurality of bottom support protrusions (414). Referring to FIG. 3, the upper support protrusion (413) may be provided in a cylindrical shape or an angular pillar shape, and may couple and fix an inner lateral frame (451) of the upper elastic member (450) to the bobbin (410). A first through hole (451a) may be formed at a position opposite to that of the upper support protrusion (413) of the inner lateral frame (451) according to the second exemplary embodiment of the present disclosure.

At this time, the upper support protrusion (413) and the first through hole (451a) may be fixed by thermal bonding or may be fixed by an adhesive member such as an epoxy. Furthermore, as illustrated, the upper support protrusion (413) may be provided in a plural number. At this time, a distance between the upper support protrusions (413) may be adequately arranged within a scope avoidable of interference of adjacent parts. That is, each upper support protrusion (413) may be symmetrically spaced apart from the other at a predetermined distance about the bobbin (410), or albeit the spaced-apart distance not being constant, each upper support protrusion (413) may be symmetrically formed about a particular imaginary line passing a center of bobbin (410).

Now, referring to FIG. 19, a bottom support protrusion may be provided in a cylindrical shape or an angular pillar shape like the upper support protrusion (413), and may couple and fix an inner lateral frame (461) of the bottom elastic member (460) to the bobbin (410). A second through hole (461a) may be formed at a position opposite to that of the bottom support protrusion of the inner lateral frame (461) according to an exemplary embodiment of the present disclosure.

At this time, the bottom support protrusion and the second through hole (461a) may be fixed by thermal bonding or may be fixed by an adhesive member such as an epoxy. Furthermore, the bottom support protrusion may be provided in a plural number. At this time, a distance between the bottom support protrusions may be adequately arranged within a scope avoidable of interference of adjacent parts. That is, each bottom support protrusion (113) may be symmetrically spaced apart from the other at a predetermined distance about the bobbin (410).

Meantime, as illustrated in FIG. 19, the number of bottom support protrusion may be smaller than that of the upper support protrusions (413), which is due to the different shapes between the upper elastic member (450) and the bottom elastic member (460). That is, as illustrated in FIG. 19, each upper elastic member (450) must be formed in a mutually bisected electrically non-connected structure to allow each member to function as a terminal for applying a current to a first coil (420) and a sufficient number of upper support protrusions (413) is fixedly provided to prevent the upper elastic members (450) from incompletely coupled with the bobbin (410).

Meanwhile, as illustrated in FIG. 19, the bottom elastic member (460) is formed in one body to allow stable coupling even with only a fewer number of bottom support protrusions than that of the upper elastic member (450). Furthermore, in contrary to the second exemplary embodiment, each of the bottom elastic members (460) may be formed in a mutually bisected electrically non-connected structure to allow each member to function as a terminal for applying a current to the first coil (420), where the upper elastic members (450) may be formed in one body.

Furthermore, two winding protrusions (415) may be provided at an upper peripheral surface of the bobbin (410). The winding protrusion (415) may be respectively wound by both distal ends of the first coil (420), where a conductible connection with a pair of solder units provided at the upper elastic member (450) can be realized. The winding protrusion (415) may be arranged in a pair at a horizontally symmetrical position about the bobbin (410).

Furthermore, the soldering coupling of the first coil (420) wound on the winding protrusion (415) at the solder unit also functions to tightly couple the inner lateral frame (451) of the upper elastic member (450) to an upper side surface of the bobbin (410) without any floating.

The first coil (420) may be provided in a ring-shaped coil block insertedly coupled to a periphery of the bobbin (410). However, the present disclosure is not limited thereto, and the first coil (420) may be directly wound on the periphery of the bobbin (410).

In the second exemplary embodiment of the present disclosure, the first coil (420) may be formed in an approximately octagonal shape, as illustrated in FIG. 19, the shape of which corresponds to that of the periphery of the bobbin (410), where the bobbin (410) may be also provided in an octagonal shape. However, the structure is not limited thereto, and any structure coupleable to the bobbin (410) may be acceptable. Furthermore, the first coil (420) may be provided with at least four surfaces with a straight line, and a corner area connecting the four surfaces may be round or straight. At this time, a part formed with a straight line may be a surface opposite to the magnet (430).

Furthermore, a surface of the magnet (430) opposite to the first coil (420) may have a same curvature as that of the first coil (420). That is, when the first coil (420) is a straight line, a surface of the magnet (430) opposite to the first coil (420) may be a straight line, and when the first coil (420) is a curved line, a surface of the magnet (430) opposite to the first coil (420) may be a curved line. Furthermore even if the first coil (420) is a curved line, a surface of magnet (430) opposite to the first coil (420) be a straight line, and vice versa.

The first coil (420) performs an auto focusing function by moving the bobbin (410) to a direction parallel with the optical axis, and when a current is supplied to the magnet (430), an electromagnetic force can be formed through interaction with the magnet (430) and the formed electromagnetic force can move the bobbin (410).

Meantime, the first coil (420) may be correspondingly formed to the magnet (430), and when the magnet (430) is formed in one body to allow an entire surface opposite to the first coil (420) to have a same polarity, the first coil (420) may also have the same polarity at a surface opposite to the magnet (430). Meantime, although not described, when the magnet (430) is bisected at a surface perpendicular to the optical axis to allow a surface opposite to the first coil (420) to be divided to two or more sections, the first coil (420) may also be divided in the number corresponding to that of divided magnet (430).

The magnet (430) may be mounted at a position opposite to that of the first coil (420). In the second exemplary embodiment of the present disclosure, the magnet (430) may be installed at a position corresponding to that of the first coil (420) of the housing (140) as illustrated in FIG. 2. The magnet (430) may be configured in one body, and the magnet (430) according to the second exemplary embodiment of the present disclosure may be arranged with an N pole at a surface opposite to the first coil (420) with an S pole at an outside surface. The present disclosure is not limited thereto, and the reverse is also possible. Furthermore, as explained above, the magnet (430) may be bisected on a plain surface perpendicular to the optical axis.

At least two magnets (430) may be installed and four magnets (430) may be installed according to the second exemplary embodiment of the present disclosure. At this time, the magnet (430) may be formed in a shape of a rectangular parallelepiped each surface having a predetermined width, and a broader surface may be installed on each lateral surface of the housing (440). At this time, the mutually opposite magnets (430) may be installed on a parallel base. Furthermore, the magnet (430) may be arranged to face the first coil (420). At this time, each surface on which the magnet (430) and the first coil (420) face each other may be arranged in a plain surface to be mutually parallel. The present disclosure is not limited thereto, and any one surface of the magnet (430) and the first coil (420) may have a plain surface, and another surface may be formed in a curved surface. Alternatively, all surfaces surface on which the magnet (430) and the first coil (420) face each other may be arranged in a curved surface. At this time, curvatures of surfaces on which the magnet (430) and the first coil (420) face each other may be same.

When the magnet (430) is arranged in the shape of a rectangular parallelepiped as illustrated, one pair of a plurality of magnets (430) may be parallel arranged to the second direction, and the other pair of magnets may be arranged to the third direction, whereby the moving control of the housing (140) for handshake correction (described later) can be made possible.

The housing (440) may be formed in an approximately square shape, and may be formed in an approximately octagonal shape as illustrated in FIG. 19 according to the second exemplary embodiment of the present disclosure. At this time, the housing (440) may include a first surface (441) and a second surface (442). The first surface (441) may be a surface mounted with the magnet (430) and the second surface may be a surface mounted with a support member (520, described later).

The first surface (441) may be formed flat, and may be formed equal to or greater than that of the magnet (430) according to the second exemplary embodiment. At this time, the magnet (430) may be fixed to a magnet recess unit (441a) formed at an inner surface of the first surface (441). The magnet recess unit (441a) may be formed with a concave groove corresponding in size to the magnet (430), and may be arranged with at least four surfaces opposite to the magnet (430). At this time, a floor surface of the magnet recess unit (441a), that is, a surface opposite to the second coil (530, described later), is formed with an opening to allow a floor surface of the magnet (430) to directly face the second coil (530). Meantime, the magnet (430) may be secured to the magnet recess unit (441a) using an adhesive. However, the present disclosure is not limited thereto, and may be fixed using an adhesive member such as a double-sided tape.

Alternatively, instead of forming the magnet recess unit (441a) in a concave groove, it may be possible to form the magnet recess unit (441a) in a window shape from which a part of the magnet can be exposed or in which a part of the magnet can be inserted. Meantime, an upper surface of the first surface (441) may be formed with an adhesive agent inlet hole configured to infuse epoxy for fixation. According the second exemplary embodiment of the present disclosure, the adhesive agent inlet hole may be provided in a tapering cylindrical shape to infuse an adhesive agent through an exposed upper surface of the housing (440). Meanwhile, the first surface (441) may be arranged in parallel with a lateral surface of the cover member (300, described later). Furthermore, the first surface (441) may be formed to have a greater surface than that of the second surface (442).

Furthermore, the housing (440) may be protrusively formed at an upper side with a plurality of upper frame support protrusions (444) coupled by an external frame (452) of the upper elastic member (450), At this time, the number of upper frame support protrusions (444) may be greater than that of upper support protrusion (413), which is because a length of external frame (452) is longer than that of inner frame (451). Meantime, the external frame (452) opposite to the upper frame support protrusion (444) may be formed with a third through hole having a shape corresponding thereto, where the external frame (452) may be fixed by adhesive agent or heat fusion.

Furthermore, the housing (140) may be formed at a bottom side with a plurality of bottom frame support protrusions (445) coupled by an external frame (462) of the bottom elastic member (460). At this time, the number of bottom frame support protrusions (445) may be greater than that of bottom support protrusion, which is because a length of the external frame (462) of bottom elastic member (460) is longer than that of the inner frame (461).

Meantime, lift-up and/or lift-down operations to a direction parallel with the optical axis of the bobbin (410) may be elastically supported by the upper and bottom elastic members (450, 460). At this time, the upper and bottom elastic members (450, 460) may be provided in leaf springs.

The upper and bottom elastic members (450, 460) may include inner frames (451, 461) coupled to the bobbin (410), external frames (452, 462) coupled to the housing (440) and connection units (453, 463) connecting the inner and external frames (451, 461, 452, 462). The connection units (453, 463) may be bent at least once to form a pattern of a predetermined shape. The lift-up and/or lift-down operation of the bobbin (410) to the first direction parallel with the optical axis can be elastically supported by position change and fine deformation of the connection units (453, 463).

Meanwhile, according to the second exemplary embodiment of the present disclosure, a corner area of the upper elastic member (450) may be integrally formed with the support member (520) to allow the support member (520) to be bent to a direction parallel with an optical axis before or after the assembly step as shown in FIG. 2. However, the present disclosure is not limited thereto, and the support member (520) may be formed as a separate member from the upper elastic member (450). When the support member (520) is formed as a separate member, the support member (520) may be formed with a leaf spring, a coil spring, a suspension wire and any member capable of elastically supporting the upper elastic member (450).

Meantime, the upper and bottom elastic member (450, 460), the bobbin (410) and the housing (440) may be assembled by a bonding operation using heat fusion and/or adhesive agent. At this time, the fixing operation may be finished by bonding using an adhesive agent after fixation using heat fusion according to assembly order.

The second lens moving unit (500), which is a handshake correction lens moving unit, may include a first lens moving (400), a base (510), a support member (520), a second coil (530), a circuit board (550) and a cover member (600), and may further include a second detection sensor (540), where two second detection sensors (540) may be arranged on the circuit board to detect x/y two directions.

That is, as illustrated in FIG. 22, the second detection sensor (540) may be arranged near a center of the second coil (530), and at least two second detection sensors (540) may be installed on an orthogonalized surface to detect z/y two directions. At this time, the second detection sensor (540) may be arranged on a second coil-mounted surface, and may be arranged on an opposite surface thereto. An installation position of the second detection sensor (540) may be so formed as not to interfere with the second coil (530).

The first lens moving unit (400) may be configured as mentioned above, and may be replaced with an optical system configured to realize an auto focusing function using other methods than the above configuration. That is, instead of using the auto focusing actuator of VCM method, the first lens moving unit (400) may be configured with an optical system using a single lens moving actuator or an actuator of reflective index-changeable method. That is, the first lens moving unit (400) may be used by any optical actuator capable of performing an auto focusing function. However, there may be a requirement that a magnet (430) be installed at a position opposite to that of the second coil (530).

The base (510) may take an approximately square shape, and include the support members (520) at four corner areas. The base (510) may be provided with a plurality of first groove parts (511) configured to inject an adhesive agent therein when fixing the cover member (600) using an adhesive agent. At least one first groove part (511) may be formed at a surface not opposite to that of a terminal surface of the circuit board (550, described later). A surface opposite to that of the terminal surface of the base (510) may be formed with a terminal surface support groove having a size corresponding to that of the terminal surface. The terminal surface support groove may be concavely and inwardly formed from a periphery of the base (510) at a predetermined depth to prevent the terminal surface from protruding to outside or to adjust a protruding amount.

Furthermore, the base (510) may be formed at a circumferential surface with a staircase to guide the cover member (600) coupled to an upper side of the staircase, and may be coupled to allow a distal end or the cover member to be surface-contacted. At this time, the staircase and the cover member (600) may be bonded, fixed and sealed using an adhesive agent.

The base (510) may be concavely formed at an upper surface with a support member recess groove to insert the support member (520) thereinto. The support member recess groove may be coated with an adhesive agent to prevent the support member (520) from moving. As illustrated, the support member (520) may be bent to be coupled to the base (510) while being integrally configured at four corners of the upper elastic member (450). A distal end of the support member (520) may be inserted into the support member recess groove and fixed by an adhesive member like epoxy.

According to the second exemplary embodiment, a total of four support members (520) may be formed as the support members (520) are formed at four corner areas of the upper elastic member (450). However, the present disclosure is not limited thereto, and a total of eight support members (520) may be formed when two support members (520) are formed at each corner area of the upper elastic member (450). Referring to FIG. 20, the support member (520) according to the second exemplary embodiment may include connection unit (521) connected to the upper elastic member (450), elastic deformation units (522, 523) and a fixation unit (524), and at least two support members (520) out of the four support members (520) may include a terminal unit (526).

The connection unit (521), which is a unit connected by a corner surface of the upper elastic member (450), may be centrally formed with a through hole (521a) to allow performing a bending work at left and right sides of the through hole (521a), whereby the support member (520) can be easily bent with a smaller force. The shape of the connection unit (521) is not limited thereto, and any shape may be allowable as long as the connection unit is bendable even without a through hole. Furthermore, when the support member (520) is formed as a member separate from the upper elastic member (450), the connection unit (521) may be a part where the support member (520) and the upper elastic member (450) are electrically connected.

The elastic deformation units (522, 523) may be provided by being bent at least once to form a pattern of a predetermined shape. According to the second exemplary embodiment, the elastic deformation unit may include first and second elastic deformation units (522, 523), each having a corresponding shape. When the first elastic deformation unit (522) is provided in an N shape formed with a straight unit to a direction parallel with an optical axis through two times of bending, the second elastic deformation unit (523) may be also formed in a corresponding shape as that of the first elastic deformation unit (522). The N shape is a simple example, and other patterns including a zigzag shape may be also possible. At this time, the first and second elastic deformation units (522, 523) may be formed in one unit instead of two separate units, and may be also formed as a pattern-less suspension wire.

Furthermore, it would be acceptable as long as the base (510) and the support member (520) can be coupled, and a groove coupled to the support member (520) may not be formed at the base (510).

The first and second elastic deformation units (522, 523) may be minutely deformed to a direction of the moving housing (440) when the housing (440) moves to the second and third directions perpendicular to the optical axis. Then, the housing (440) can move only to the second and third directions which are plain surfaces perpendicular to the optical axis with almost no position change relative to the first direction which is a direction parallel with the optical axis, whereby accuracy of handshake correction can be enhanced, where the characteristic of the elastic deformation unit (522) extendable to a lengthwise direction is utilized for the accuracy.

The fixation unit (524) may be provided at a distal end of the support member (520). Furthermore, the fixation unit (524) may be provided in a plate shape wider than that of the elastic deformation units (522, 523). The present disclosure is not limited thereto and the fixation unit (524) may have a width equal to or narrower than that of the elastic deformation units (522, 523). The fixation unit (524) may be inserted into the support member recess groove of the base (510) and may be fixed and coupled by adhesive member such as epoxy. However, the present disclosure is not limited thereto, and the fixation unit (524) may be press-fitted into the support member recess groove (514) by forming the fixation unit (524) to match to the support member recess groove formation-wise.

The terminal unit (526) may be formed by bending at least once a plate-shaped member extended from the fixation unit (524). The terminal unit (526) may be conductively connected to a pad (556) provided at the PCB (550) using a soldering method and the like. To this end, a surface of the terminal unit (526) and a surface of the pad (556) may be arranged to face each other. At this time, the terminal unit (526) and the pad (556) may surface-contact each other, and as illustrated, a conductive member like a solder may be interposed between the terminal unit (526) and the pad (556) spaced apart at a predetermined distance. The support member (520) can supply an electric power of mutually different polarities to an upper elastic member (450) side through the coupling between the terminal unit (526) and the pad (556), whereby a fixation power towards the base (510) of the support member (520) can be simultaneously increased.

Furthermore, the terminal unit (526) may be integrally formed with the upper elastic member (450), or may be electrically connected to the upper elastic member (450) even if separated from the upper elastic member (450). The terminal unit (526) may be electrically connected to the circuit board (550) at a distal end or near the distal end regardless of integral formation or separation formation with the upper elastic member (450). Furthermore, the terminal unit (526) may be formed extended or bent as illustrated in FIG. 3.

The second coil (530) may be arranged to face the magnet (430) fixed at the cover member (600). For example, the second coil (530) may be arranged at an external side of the magnet (430). According to the second exemplary embodiment, a total of four second coils (530) may be installed at four surfaces. However, the present disclosure is not limited thereto, and only one for second direction and one for third direction may be installed, and four or more second coils may be installed. The second coil (530) may be formed by winding a wire in a doughnut-shape, and a start line and an end line of the second coil may be conductively connected to a terminal formed on the circuit board (550).

The second coil (530) may be installed at an inner surface of the circuit board (550) arranged at an inner side of the cover member (600). However, the present disclosure is not limited thereto, and the second coil (530) may be directly connected to an inner circumferential surface of the cover member (600), or may be formed on a separate substrate, where the substrate may be stacked on the circuit board (550).

The first detection sensor (560) configured to detect a z direction movement may be arranged at a position opposite to a sensing magnet (400) of the circuit board (550). For example, when the sensing magnet (400) is installed at an upper surface of the bobbin (410), the first detection sensor (560) may be arranged at a position opposite to that of the sensing magnet (400) at an inner surface of a frame unit (550a) of the circuit board (550, described later).

Referring to FIG. 19, at least one sensing magnet (400) configured to detect a z direction movement may be installed near to a corner area of the upper surface of the bobbin (410), where the first detection sensor (560) can detect a first direction movement of the first lens moving unit (100) by detecting changes in magnetic field in response to position change of the sensing magnet (400). The first detection sensor (560) may be provided as a Hall sensor, and any sensor may be used for the first detection sensor (560) as long as it can detect a change in magnetic force. Furthermore, the installation position and the number of the first detection sensor (560) may be arranged to match to those of the sensing magnet (400).

The circuit board (550) may be coupled to an inner lateral surface of the cover member (600) and may include a frame unit (550a) supported to an inner side of the cover member (600) and a substrate unit (550b) mounted with the second coil (530). At this time, the at least one of the substrate units (550b) may be provided as a terminal surface. In the second exemplary embodiment, the circuit board may be formed with two bent terminal surfaces. The terminal surface may be arranged with a plurality of terminals (551) to supply a current to the first and second coils (420, 530) by receiving an external power. The number of terminals formed on the terminal surface may increase or decrease in response to the types of elements necessary for control. Meantime, the PCB may be replaced with an FPCB (Flexible PCB) according to the second exemplary embodiment. The present disclosure however is not limited thereto, and the terminal of the circuit board (550) may be directly formed on a surface of the base (510) by using a surface electrode method.

Furthermore, the circuit board (550) may be installed with a pad (not shown) conductively connected to the terminal unit (526) provided at the support member (520). This configuration enables the handshake correction by moving the housing (440) to the second and third directions through the interaction between the second coil (530) and the magnet (430).

The cover member (600) may be formed in an approximate shape of a box, and may encompass the first and second lens moving units (100, 500). At this time, as illustrated in FIG. 18, a second groove unit (610) is formed at a position opposite to that of the first groove part (511) of the base (510), whereby a groove unit of a predetermined area may be formed by coupling of the first and second groove parts (511, 610). The groove unit may be coated with an adhesive member having a viscosity. That is, the adhesive member coated on the groove unit can fill up a gap formed by opposite surfaces of the cover member (600) and the base (510) using the groove unit, whereby the cover member (600) and the base (510) may be coupled and sealed together.

Furthermore, a surface opposite to the terminal surface of the circuit board (550) at the cover member (600) may be formed with a third groove unit (620) to prevent interference with the plurality of terminals (551) formed at the terminal surface. The third groove unit (620) may be concavely formed on an entire surface opposite to the terminal surface, and the adhesive member may be inwardly coated to seal the cover member (600), the base (510) and the circuit board (550).

Thus, according to the abovementioned configuration, the magnet (430) may be commonly shared to realize the auto focusing operation and the handshake correction operation of the first and second lens moving units (400, 500) to reduce the number of parts and to enhance the responsiveness by reducing the weight of the housing (440). Of course, an auto focusing magnet and a handshake correction magnet may be separately formed. Furthermore, the support member (520) may be integrally formed with the upper elastic member (450), and bent to reduce the weight and to enhance the assemblage. Furthermore, parts such as the second coil (530) are modularized at an inner surface of the cover member (600) to simplify the assembly process.

The camera module according to the abovementioned second exemplary embodiment of the present disclosure may include a lens moving unit comprised of the first and second lens moving units (400, 500), a lens barrel coupled to the bobbin (410), an image sensor and a PCB. At this time, the PCB may be mounted with an image sensor to form a floor surface of the camera module.

The bobbin (410) may include therein a lens barrel mounted with at least one lens, where the lens barrel may be screw-connected to an inner circumferential surface of the bobbin (410). The present disclosure is not limited thereto, albeit not being illustrated, and instead of forming a screw thread at an inner circumferential surface of the bobbin (410), the lens barrel may be directly fixed to an inside of the bobbin (410) by other methods than the screw connection. Alternatively, one or more sheets of lenses may be integrally formed with the bobbin (410) free from the lens barrel. The optical system may be formed with one sheet of lens or two or more sheets of lenses coupled to the lens barrel.

The base (410) may be additionally formed at a position opposite to that of the image sensor with a UV cut-off filter, which may be coupled to the cover member (600) and may support a bottom surface of the cover member (600). The base (410) may be mounted with a separate terminal member for electrical conduction with the PCB, and a terminal may be integrally formed using a surface electrode method. Meantime, the base (510) may function as a sensor holder to protect the image sensor, and in this case, a protrusion may be formed to a bottom side direction along a lateral surface of the base (510). However, this is not an essential configuration, and albeit not illustrated, a separate sensor holder may be arranged at a bottom surface of the base (510) to perform a function of the sensor holder.

The previous description of the present disclosure is provided to enable any person skilled in the art to make or use the inventive disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

What is claimed is:

1. A lens moving unit, the lens moving unit comprising:
   a first lens moving unit including a bobbin mounted at an inner side with at least one lens and formed at a periphery with a first coil, and a housing configured to support a magnet arranged at a surrounding of the bobbin to move the bobbin and the first coil to a first direction parallel with an optical axis in response to interaction between the magnet and the first coil; and a second lens moving unit including a base spaced apart at a predetermined distance from the bobbin and the first lens moving unit, a support member configured to movably support the first lens moving unit to second and third directions relative to the base and to supply an electric power to the first coil, and a circuit board including a detection sensor configured to detect positions of the second and third directions of the second lens moving unit relative to a second coil and the base opposite to the magnet of the first lens moving unit to thereby move an entire first lens moving unit including the bobbin to the mutually different second and third directions which is perpendicular to the optical axis in response to the interaction between the magnet and the second coil.

2. The lens moving unit of claim 1, further comprising a cover member configured to encompass the first and second lens moving units by being coupled to the base.

3. The lens moving unit of claim 2, wherein the bobbin includes a first stopper protrusively formed at an upper surface with a first height, and a second stopper protrusively formed at a lateral surface of an upper surface to a circumferential direction, wherein the first stopper prevents an inner surface of the cover member from colliding with a bobbin body, and the second stopper prevents the bobbin from colliding with the base.

4. The lens moving unit of claim 2, wherein the housing includes a first surface mounted with four magnets, a second surface configured to interconnect with the first surface and arranged with the support member, a third stopper protrusively formed from an upper surface to prevent interference with the cover member, and a fourth stopper protrusively formed from a floor surface to prevent interference with the base.

5. The lens moving unit of claim 4, wherein the second surface includes an escape groove to prevent the support member from interfering with the housing.

6. The lens moving unit of claim 5, wherein the second surface further includes a staircase unit formed at an upper side of the escape groove.

7. The lens moving unit of claim 5, wherein the second surface further includes a diaphragm configured to accommodate damping silicon.

8. A lens moving unit, the lens moving unit comprising:
a first lens moving unit including a bobbin mounted at an inner side with at least one lens and formed at a periphery with a first coil, and a housing configured to support a magnet arranged at a surrounding of the bobbin to move the bobbin and the first coil to a first direction parallel with an optical axis in response to interaction between the magnet and the first coil;

a second lens moving unit including a base spaced apart at a predetermined distance from the housing, a support member configured to movably support the first lens moving unit to second and third directions relative to the base and to supply an electric power to the first coil, a second coil arranged opposite to the magnet of the first lens moving unit, and a circuit board including a detection sensor configured to detect a position of the first direction of the housing relative to the base by detecting a sensing magnet mounted on the first lens moving unit and changes in magnetic field of the sensing magnet to thereby move the housing to the mutually different second and third directions which is perpendicular to the optical axis in response to the interaction between the magnet and the second coil; and a cover member configured to encompass the first and second lens moving units by being coupled to the base.

9. The lens moving unit of claim 8 further comprising a second detection sensor configured to detect positions of the second and third directions.

10. The lens moving unit of claim 8, wherein the second coil includes a plurality of circuit boards coupled to an inner lateral wall of the cover member.

11. The lens moving unit of claim 1, wherein the first lens moving unit includes an octagonal bobbin having at least four straight surfaces and corner surfaces configured to connect the at least four straight surfaces, a first coil wound on a periphery of the bobbin, a magnet arranged at a position opposite to the straight surface of the first coil, a housing fixed by the magnet, and upper and bottom elastic members, an inner frame of which is coupled to the bobbin and an outer frame of which is coupled to the housing.

12. The lens moving unit of claim 1, wherein the housing includes a recess groove having a size corresponding to that of the second stopper at a position opposite to that of the second stopper.

13. The lens moving unit of claim 1, wherein the support member is integrally formed with the upper elastic member.

14. The lens moving unit of claim 13, wherein the support member includes a connection unit connected to the upper elastic member, first and second elastic deformation units extensively formed from the connection unit, and a fixation unit fixedly coupled to the base.

15. The lens moving unit of claim 14, wherein at least four support members are provided to support the second lens moving unit, and at least two support members further include terminal units each having a different polarity.

16. The lens moving unit of claim 14, wherein the support member is interposed between the first and second elastic deformation units and further includes a damping connection unit formed in a space formed by the diaphragm.

17. The lens moving unit of claim 16, wherein upper side and bottom side shapes of the first and second elastic deformation units mutually correspond, while the first and second elastic deformation units are interposed between the damping connection unit.

18. The lens moving unit of claim 16, wherein each of the first and second elastic deformation units takes a shape of a wire free from pattern.

19. The lens moving unit of claim 14, wherein the fixation unit is wider than each width of the first and second elastic deformation units.

20. The lens moving unit of claim 1, wherein the base is concavely formed with a support member recess groove at a position opposite to that of the support member.

21. The lens moving unit of claim 20, wherein the support member recess groove is formed at four corner areas of the base.

22. The lens moving unit of claim 1, wherein the second coil is formed at an upper surface of the circuit board mounted at an upper side of the base.

23. The lens moving unit of claim 1, wherein the second coil is provided at an upper surface of the circuit board mounted at an upper surface of the base with a substrate having a pattern coil, and coupled to the circuit board in the form of lamination.

24. The lens moving unit of claim 1, wherein the second coil is integrally formed at an upper surface of the base in the form of a surface electrode.

25. The lens moving unit of claim 1, wherein the detection sensor is any one of a Hall sensor aligned with a center of the second coil and insertedly coupled to a detection sensor recess groove formed at the base and a photo reflector.

26. The lens moving unit of claim 8, wherein a total of two detection sensors are provided, where each imaginary line connecting a center of the base to each center of the detection sensors is perpendicularly arranged.

27. The lens moving unit of claim 8, wherein the magnet is dual-purposely used as an auto focusing magnet configured to move the bobbin to the first direction and as a handshake correction magnet configured to move the housing to the second and third directions.

28. The lens moving unit of claim 8, wherein the second coil is formed at an inner surface of the circuit board mounted at an inner lateral surface of the cover member.

29. The lens moving unit of claim 8, wherein the second coil is provided at an upper surface of the circuit board mounted at an inner lateral surface of the cover member with a substrate having a pattern coil, and is coupled to the circuit board in the form of lamination.

30. The lens moving unit of claim 8, wherein the second coil is integrally formed at an inner lateral surface of the cover member in the form of a surface electrode.

31. The lens moving unit of claim 9, wherein the second detection sensor is any one of a Hall sensor aligned with a center of the second coil and insertedly coupled to a detection sensor recess groove formed at the base and a photo reflector.

32. The lens moving unit of claim 8, wherein the sensing magnet is arranged at an upper surface of the first lens moving unit.

33. The lens moving unit of claim 32, wherein at least one sensing magnet is arranged at a corner area of the upper surface of the bobbin.

34. A camera module, the camera module comprising:
an image sensor;
a PCB mounted with the image sensor; and
a lens moving unit in accordance with claim 1.

* * * * *